US012743882B2

(12) United States Patent
Prakash et al.

(10) Patent No.: US 12,743,882 B2
(45) Date of Patent: Sep. 22, 2026

(54) SYSTEMS AND METHODS FOR IDENTIFYING HAZARD TREES

(71) Applicant: AIDash Inc., San Jose, CA (US)

(72) Inventors: Pranav Prakash, San Jose, CA (US); Akshay Patil, San Jose, CA (US); Ankur Saxena, Bengaluru (IN)

(73) Assignee: AIDash Inc, Palo Alto, CA (US)

(*) Notice: Subject to any disclaimer, the term of this patent is extended or adjusted under 35 U.S.C. 154(b) by 0 days.

(21) Appl. No.: 18/889,308

(22) Filed: Sep. 18, 2024

(65) Prior Publication Data

US 2026/0080678 A1 Mar. 19, 2026

(51) Int. Cl.

| | |
|---|---|
| ***G06V 20/10*** | (2022.01) |
| ***G01C 11/04*** | (2006.01) |
| ***G06V 10/72*** | (2022.01) |
| ***G06V 10/764*** | (2022.01) |
| ***G06V 10/82*** | (2022.01) |
| ***G06V 20/50*** | (2022.01) |

(52) U.S. Cl.

CPC ............ *G06V 20/188* (2022.01); *G01C 11/04* (2013.01); *G06V 10/72* (2022.01); *G06V 10/764* (2022.01); *G06V 10/82* (2022.01); *G06V 20/50* (2022.01)

(58) Field of Classification Search

CPC ...... G06V 20/188; G06V 10/82; G06V 10/72; G06V 20/50; G06V 10/764; G01C 11/04

See application file for complete search history.

(56) References Cited

U.S. PATENT DOCUMENTS

| | | | |
|---|---|---|---|
| 8,352,410 | B2 | 1/2013 | Rousselle et al. |
| 10,460,169 | B1 | 10/2019 | Adler |
| 11,144,758 | B2 | 10/2021 | Lavi |
| 11,308,714 | B1 | 4/2022 | Christoudias et al. |
| 11,842,538 | B2 | 12/2023 | Saxena et al. |
| 2008/0105045 | A1 | 5/2008 | Woro |
| 2009/0304236 | A1 | 12/2009 | Francini et al. |
| 2012/0169498 | A1 | 7/2012 | Leppanen et al. |
| 2018/0218214 | A1 | 8/2018 | Pestun et al. |
| 2018/0260626 | A1 | 9/2018 | Pestun et al. |
| 2018/0336460 | A1 | 11/2018 | Tschemezki et al. |

(Continued)

OTHER PUBLICATIONS

Yarak, Kanitta, et al. "Oil palm tree detection and health classification on high-resolution imagery using deep learning." Agriculture 11.2 (2021): 183. (Year: 2021).*

(Continued)

*Primary Examiner* — Utpal D Shah

(74) *Attorney, Agent, or Firm* — Ahmann Kloke LLP

(57) ABSTRACT

Identifying hazard trees is described. An example method includes receiving multiple images for a geographic area that includes multiple electrical assets of a power distribution infrastructure. Pixels of the multiple images are classified as hazard tree pixels or as non-hazard tree pixels using one or more convolutional neural networks. Multiple polygons are generated based on the hazard tree pixels, a polygon corresponding to one or more hazard trees in the geographic area. A height of a polygon and a distance from the polygon to an electrical asset is determined. Based on the height and the distance, the one or more hazard trees corresponding polygon are determined to represent a potential hazard to the electrical asset. A notification of the potential hazard to the electrical asset is generated and provided.

21 Claims, 17 Drawing Sheets

(56) References Cited

U.S. PATENT DOCUMENTS

| | | | | |
|---|---|---|---|---|
| 2019/0098687 | A1 | 3/2019 | Backholm et al. | |
| 2019/0129039 | A1 | 5/2019 | Schubert et al. | |
| 2019/0155973 | A1 | 5/2019 | Morczinek et al. | |
| 2019/0197134 | A1 | 6/2019 | Reyes Martinez et al. | |
| 2020/0075168 | A1 | 3/2020 | Frank et al. | |
| 2020/0250424 | A1 | 8/2020 | Klein et al. | |
| 2021/0073692 | A1* | 3/2021 | Saha | G08B 21/16 |
| 2021/0097850 | A1 | 4/2021 | Ton-That et al. | |
| 2021/0118117 | A1 | 4/2021 | Albrecht et al. | |
| 2021/0142559 | A1* | 5/2021 | Yousefhussien | G06N 3/0895 |
| 2021/0232818 | A1 | 7/2021 | Saxena et al. | |
| 2022/0180016 | A1 | 6/2022 | Jenks et al. | |
| 2022/0414362 | A1 | 12/2022 | Lautala et al. | |
| 2023/0386199 | A1* | 11/2023 | Klein | G06Q 10/04 |
| 2024/0071073 | A1 | 2/2024 | Rajora et al. | |
| 2024/0330027 | A1* | 10/2024 | Zeng | G06F 40/186 |

OTHER PUBLICATIONS

Abdollahnejad, Azadeh, and Dimitrios Panagiotidis. “Tree species classification and health status assessment for a mixed broadleaf-conifer forest with UAS multispectral imaging.” Remote Sensing 12.22 (2020): 3722. (Year: 2020).*

Canadian Patent Application No. 3168831, Examination Report dated Aug. 28, 2023, 3 pages.

European Patent Application No. 21747885.8, Extended European Search Report dated Dec. 12, 2023, 9 pages.

International Application No. PCT/US2023/031302, International Search Report and the Written Opinion, dated Nov. 30, 2023, 13 pages.

UP42, “Stereo imagery, DSM, and machine learning for vegetation management,” [retrieved online from https://up42.com/blog/tech/stereo-imagery-dsm-and-machine-learning-for-vegetation-management on Jan. 19, 2023].

Zhentian, Jiao, et al., “A Deep Learning Based Forest Fire Detection Approach Using UAV and YOLOv3”, 2019 1st International Conference on Industrial Artificial Intelligence (IAI) IEEE, Jul. 23, 2019 (Jul. 23, 2019), pp. 1-5, XP033621505, DOI: 10.1109/ICIAI.2019.8850815.

Bastani, F. et al., Satlaspretrain: A Large-Scale Dataset for Remote Sensing Image Understanding, Aug. 21, 2023, https://arxiv.org/abs/2211.15660.

Byer, S., and Jin, Y., Detecting drought-induced tree mortality in sierra nevada forests with time series of satellite data, Remote Sensing, Sep. 2017, vol. 9. doi: 10.3390/rs9090929.

Cheng, Y., et al., Scattered tree death contributes to substantial forest loss in California, Nature Communications, Jan. 2024, vol. 15. Doi: 10.1038/s41467-024-44991-z.

Garrity, S.R., et al., Quantifying tree mortality in a mixed species woodland using multitemporal high spatial resolution satellite imagery, Remote Sensing of Environment, Feb. 2013, vol. 129, pp. 54-65, 2013.

Hutter, F. et al., An Efficient Approach for Assessing Hyperparameter Importance, Proceedings of the 31st International Conference on Machine Learning, Jun. 2014, pp. 754-762, vol. 32, PMLR, Beijing, China.

Liu, X., et al., Mapping standing dead trees in temperate montane forests using a pixel-and object-based image fusion method and stereo worldview-3 imagery, Ecological Indicators, Dec. 2021, article 108438, vol. 133. <https://doi.org/10.1016/j.ecolind.2021.108438>.

Oquab, M. et al., Dinov2: Learning Robust Visual Features Without Supervision, Transactions on Machine Learning, Jan. 2024.

Paszke, A. et al., Enet: A Deep Neural Network Architecture for Real-Time Semantic Segmentation, Jun. 7, 2016. <https://arxiv.org/abs/1606.02147>.

Prakash, Pranav & Saxena, Ankur, Hazard Tree Instance Detection via Deep Neural Network Models, IGARSS, Aug. 2025, pp. 3709-3713, doi: 10.1109/IGARSS55030.2025.11243161.

Xu, C. et al., Detecting Tiny Objects in Aerial Images: A Normalized Wasserstein Distance and a New Benchmark, ISPRS Journal of Photogrammetry and Remote Sensing, Jun. 2022, pp. 79-93, vol. 190. <https://arxiv.org/abs/2206.13996v1>.

European Patent application No. 23861152.9, Extended European Search Report dated Jul. 8, 2026, 10 pages.

Herrero-Huerta, Mónica et al., Dense Canopy Height Model from a low-cost photogrammetric platform and LIDAR data, Trees Berlin, Feb. 25, 2016, p. 1287-1301, vol. 30, No. 4, ISSN: 0931-1890, DOI: 10.1007/S00468-016-1366-9.

Mills, Steven J. et al., Evaluation of Aerial Remote Sensing Techniques for Vegetation Management in Power-Line Corridors, IEEE Transactions On Geoscience and Remote Sensing IEEE, Sep. 1, 2010, pp. 3379-3390, vol. 48, No. 9, USA, XP011309408, ISSN: 0196-2892, DOI: 10.1109/TGRS.2010.2046905.

* cited by examiner

400

```
def get_gaussian_weights_pixels(image):
    footprint = square (3)
    eroded_img = erosion (image, footprint [..., np.newaxis])
    boundaries = np.uint8(~(eroded_img>0) & (image>0))
    boundaries_gauss = gaussian (boundaries, sigma=3, channel_axis = 2)*600+ 0.1*image
    boundaries_gauss = 0.01+boundaries_gauss
    return boundaries_gauss
```

```
for c in range(C):
    inputs_class = inputs [..., c]
    masks = targets [..., c]
    for idx in range(N):
        mask = tf.reshape(masks [idx], [-1])
        input_class = tf.reshape(inputs_class [idx], [-1])

        if tf.math.reduce sum(mask) == 0 and tf.math.reduce_sum(tf.cast(tf.math.greater(input_class, 0.25), tf.float32)) == 0:
            continue

        distance = tf.math.abs(tf.math.subtract (mask, input_class))
        distance_sorted, indices = tf.math.top_k(tf.reshape(distance, [-1]), k=tf.size(distance), sorted=True)
        mask_sorted = tf.gather(tf.reshape(mask, [-1]), indices)

        inter=tf.math.reduce_sum(mask_sorted) -tf.math.cumsum (mask_sorted, axis=0)
        union = tf.math.reduce_sum(mask_sorted) +tf.math.cumsum (1.0 - mask_sorted, axis=0)
        iou = 1.0 - tf.math.divide(inter, union)

        p = tf.shape(mask_sorted) [0]
        iou = tf.concat([iou [0:1], iou [1:] - iou[:-1]], axis=0)

        loss += (tf.tensordot(distance_sorted, tf.stop_gradient(iou), 1))**F_GAMMA
        non_empty_C += 1
if (non_empty_C == 0):
    return tf.cast(non_empty_C, tf.float32)
return tf.cast(tf.cast(loss, tf.float32) / tf.cast(non_empty_C, tf.float32), tf.float32)
```

FIG. 4B

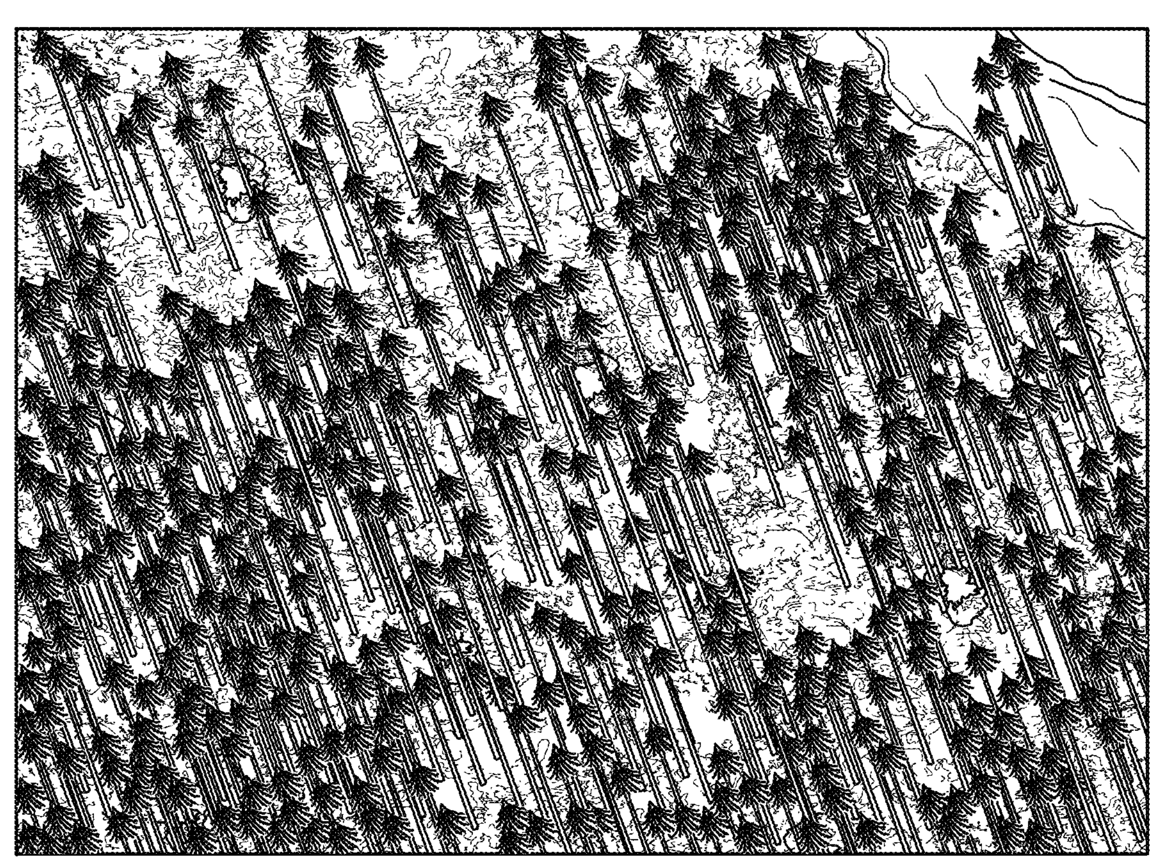
FIG. 7

850
Input_2 | Input Layer | Input: [(None,None,None,4)] | Output: [(None,None,None,4)]
tt_aug_2 | TTAug | Input: (None,None,None,4) | Output: (None, 512, 512, 4)
Model_3 | Functional | Input: (None,None,None,4) | Output: (None,None,None,1)
tt_de_aug_2 | TTDeAug | Input: (None, 512, 512, 1) | Output: (None, 512, 512, 1)

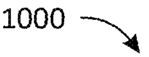
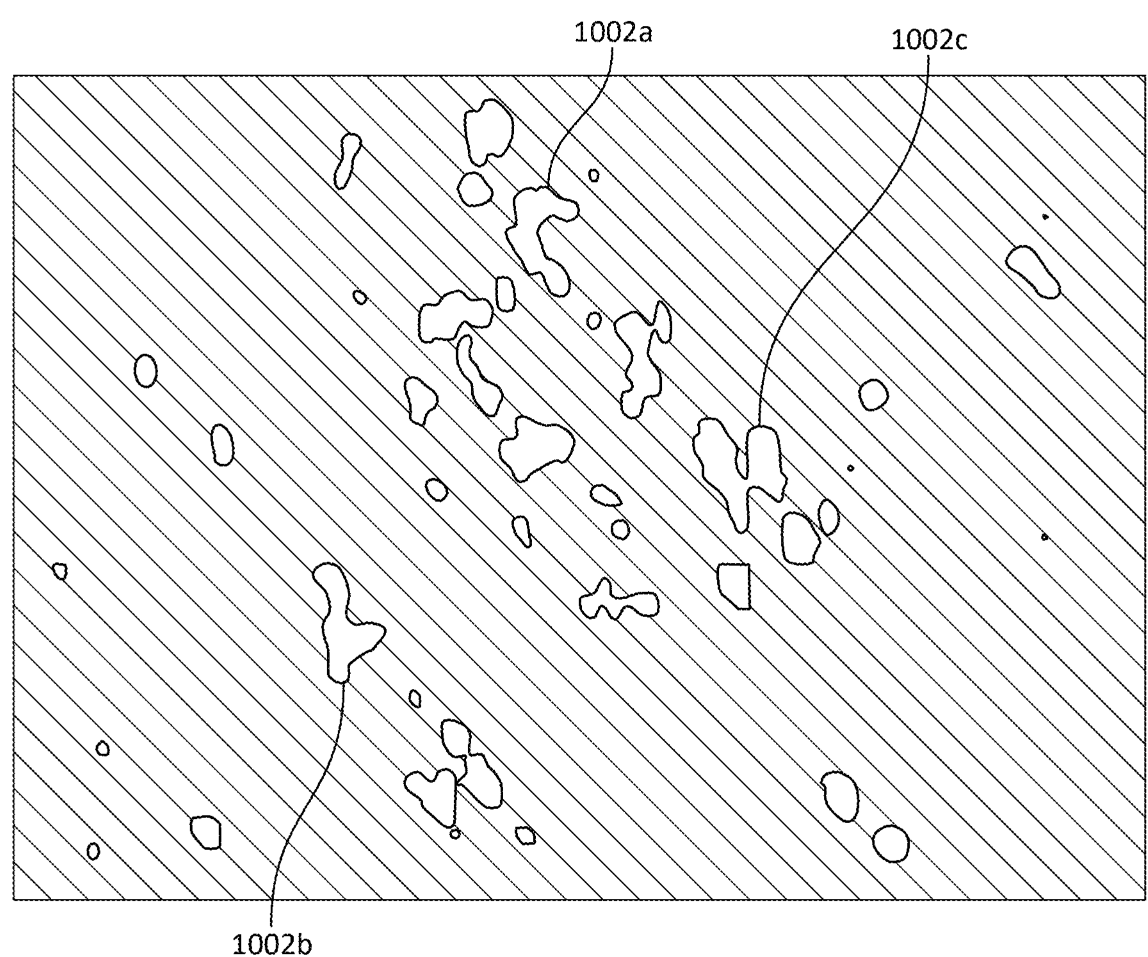
FIG. 10

1200

| | treearea ▿ | treeid | feeder | span_id | mean_height | hp_85 | dist | probmean | master _tre | tree_digit |
|---|---|---|---|---|---|---|---|---|---|---|
| 1 | 114.0587674... | 1305_13 | 02014 | 54577174-a5... | 136.445437... | 138.3781752... | 16.4269468... | 0.988122399... | 1305 | bcaec3d9-c... |
| 2 | 129.520248... | 1302_11 | 02014 | 54577174-a5... | 135.578645... | 139.9816397 | 13.06706932... | 0.998991144... | 1302 | bcaec3d9-c... |
| 3 | 129.520248... | 1302_11 | 02014 | 0c3b8c20-4... | 135.578645... | 139.9816397... | 14.80799161 | 0.998991144... | 1302 | bcaec3d9-c... |
| 4 | 129.5201828... | 1302_10 | 02014 | 54577174-a5... | 136.355295... | 139.0168267... | 10.67982575... | 0.98858957... | 1302 | bcaec3d9-c... |
| 5 | 224.4145052... | 1306_0 | 02014 | 54577174-a5... | 135.398859... | 140.4891547... | 0 | 0.996710675... | 1306 | bcaec3d9-c... |
| 6 | 185.890893... | 1306_8 | 02014 | 54577174-a5... | 132.7521451... | 140.387386... | 14.03971732... | 0.91645929... | 1306 | bcaec3d9-c... |
| 7 | 129.5200785... | 1301_15 | 02014 | 54577174-a5... | 133.006092... | 136.5158920... | 6.914791408... | 0.93225404... | 1301 | bcaec3d9-c... |
| 8 | 74.75216930... | 1301_16 | 02014 | 54577174-a5... | 132.7282265... | 135.380393... | 9.30203501 | 0.99954292... | 1301 | bcaec3d9-c... |
| 9 | 213.4666120... | 1508_6 | 02014 | 0c3b8c20-4... | 131.5944568 | 138.032059... | 31.76628175... | 0.960661169... | 1508 | bcaec3d9-c... |
| 10 | 224.4143245... | 1305_2 | 02014 | 54577174-a5... | 131.0922463... | 133.1794085... | 0 | 0.99384203... | 1305 | bcaec3d9-c... |
| 11 | 125.365366... | 1301_14 | 02014 | 54577174-a5... | 129.586485... | 131.55411718... | 4.527547789... | 0.959617687 | 1301 | bcaec3d9-c... |
| 12 | 224.4150687 | 1508_7 | 02014 | 0c3b8c20-4... | 129.3717450... | 134.7437999... | 29.8041590... | 0.991717746... | 1508 | bcaec3d9-c... |
| 13 | 129.5201337 | 2450_7 | 02014 | 54577174-a5... | 128.7831085... | 130.459854... | 41.91579769 | 0.99916665... | 2450 | bcaec3d9-c... |
| 14 | 129.5189905... | 6754_7 | 02014 | f1a32c53-86... | 128.364168... | 130.4447160... | 18.07857793... | 0.99986875... | 6754 | bcaec3d9-c... |
| 15 | 193.0152622... | 4997_1 | 02014 | da664c57-b... | 128.4411528... | 132.6093831... | 137.9904281 | 0.98016064... | 4997 | bcaec3d9-c... |
| 16 | 224.4143288... | 2450_6 | 02014 | 54577174-a5... | 127.5946229... | 132.1064623... | 43.2935727... | 0.997591180... | 2450 | bcaec3d9-c... |
| 17 | 129.5201312... | 1305_3 | 02014 | 54577174-a5... | 128.358209... | 130.0026216... | 0 | 0.965198727... | 1305 | bcaec3d9-c... |

FIG. 12

SYSTEMS AND METHODS FOR IDENTIFYING HAZARD TREES

FIELD OF THE INVENTION(S)

Embodiments of the present invention(s) are generally related to identifying hazard trees using images, such as satellite images, and in particular to identifying hazard trees that may pose a potential hazard or risk to electrical assets of power distribution infrastructures of electric utilities.

BACKGROUND

Vegetation management is generally a challenging task for utilities. Over the years, falling and/or encroaching vegetation has led to large-scale power outages, extreme weather events, wildfires, natural disasters, and other vegetation-related hazards. As a result, pressure has increased on utilities, such as electrical power distribution utilities, to improve vegetation management. Manual vegetation management, however, is expensive and may impact system reliability. Further, it is difficult to manually inspect vegetation around electrical assets within a system that extends hundreds to thousands of miles, particularly over inaccessible terrain.

Current methods of vegetation management include sending utility workers to survey the trees and other vegetation in one particular area within a large geographic area. Utility workers may manually inspect trees and take notes about physical attributes such as tree health, tree height, height profiles at sub-tree levels, and other details. These solutions may be inefficient and time-consuming, particularly in view of the fact that power lines are geographically dispersed. In the U.S. alone, there are millions of miles of local distribution lines, and at least hundreds of thousands of miles of high-voltage transmission lines.

Manual tree inspection is costly, takes time (particularly travel time), and exposes workers to risk. Manual inspections are clearly not scalable. Furthermore, manual inspections may not result in information that can be used to assess the risks of vegetation, such as hazard trees, to electrical assets of an electrical power distribution infrastructure of a utility. A hazard tree may refer to any tree or vegetation that is dead, is unhealthy, or that has structural or other material defects. One example of a hazard tree is a dead tree that is proximate to an electric line.

A potential risk that hazard trees present is that they may fall into or onto electrical assets such as electrical transmission or distribution lines. Such hazard trees may be the vegetation that is most likely to impact electrical assets. Utility workers may miss such hazard trees, or the utility workers may make inaccurate assessments of parameters of a hazard tree such as tree height, tree crown area, and distance from the hazard tree to an electrical asset. Further, changes over time may be inaccurately estimated, thereby creating or increasing risk before hazard trees can be removed or otherwise controlled.

SUMMARY

In some aspects, the techniques described herein relate to a non-transitory computer-readable medium including executable instructions, the executable instructions being executable by one or more processors to perform a method, the method including: receiving multiple images for a geographic area, the geographic area including multiple electrical assets of a power distribution infrastructure; classifying, using one or more convolutional neural networks, at least some pixels of each image of the multiple images as hazard tree pixels or as non-hazard tree pixels; generating, based on at least some of the hazard tree pixels, multiple polygons, a polygon of the multiple polygons corresponding to one or more hazard trees in the geographic area; and for at least a particular polygon of the multiple polygons: determining a height for the particular polygon; determining a distance from the particular polygon to a particular electrical asset of the multiple electrical assets; determining, based on the height and the distance, that one or more particular hazard trees corresponding to the particular polygon is a potential hazard to the particular electrical asset; generating a notification of the potential hazard to the particular electrical asset; and providing the notification of the potential hazard to the particular electrical asset.

In some aspects, the techniques described herein relate to a non-transitory computer-readable medium wherein classifying, using the one or more convolutional neural networks, at least some pixels of each image of the multiple images as the hazard tree pixels or as the non-hazard tree pixels includes: generating multiple probability data structures by processing the multiple images using the one or more convolutional neural networks, a probability data structure of the multiple probability data structures corresponding to an image of the multiple images and including, for each pixel of at least some pixels of the image, a probability value that indicates a probability that the pixel is a portion of the one or more hazard trees; and generating multiple classification data structures based on the multiple probability data structures, a classification data structure corresponding to an image of the multiple images and including, for each pixel of at least some pixels of the image, a classification of the pixel as a hazard tree pixel or as a non-hazard tree pixel.

In some aspects, the techniques described herein relate to a non-transitory computer-readable medium wherein generating the multiple classification data structures based on the multiple probability data structures includes, for each probability data structure of at least some of the multiple probability data structures: for each probability value of at least some of the probability values in the probability data structure: comparing the probability value to a threshold value; if the probability value is equal to or greater than the threshold value, classifying the pixel corresponding to the probability value as a hazard tree pixel; and if the probability value is less than the threshold value, classifying the pixel corresponding to the probability value as a non-hazard tree pixel; and generating a classification data structure that includes, for each pixel of at least some pixels of the image, the classification of the pixel as a hazard tree pixel or as a non-hazard tree pixel.

In some aspects, the techniques described herein relate to a non-transitory computer-readable medium wherein a pixel of an image of the multiple images has one or more intensity values, and the method further includes normalizing the one or more intensity values of each pixel of at least some pixels of each image of the multiple images.

In some aspects, the techniques described herein relate to a non-transitory computer-readable medium, the method further including training the one or more convolutional neural networks using one or more generative adversarial networks.

In some aspects, the techniques described herein relate to a non-transitory computer-readable medium, the method further including, for at least the particular polygon, determining a risk posed to the particular electrical asset by the one or more particular hazard trees corresponding to the particular polygon, wherein: generating the notification of the potential hazard to the particular electrical asset includes generating a user interface that includes the particular electrical asset and an indication of the risk to the particular electrical asset, and providing the notification of the potential hazard to the particular electrical asset includes providing the user interface.

In some aspects, the techniques described herein relate to a non-transitory computer-readable medium wherein classifying, using the one or more convolutional neural networks, at least some pixels of the multiple images as the hazard tree pixels or as the non-hazard tree pixels includes, for each image of the multiple images: generating one or more transformed images by performing one or more transformations on the image; processing, by the one or more convolutional neural networks, the one or more transformed images to generate one or more intermediate values for each pixel of at least some pixels of the image; and classifying, based on the one or more intermediate values, each pixel of at least some pixels of the image as a hazard tree pixel or as a non-hazard tree pixel.

In some aspects, the techniques described herein relate to a non-transitory computer-readable medium wherein generating the one or more transformed images by performing the one or more transformations on the image includes performing one or more of a rotation of the image, a flip of the image, a resizing of the image, and an addition of noise to the image.

In some aspects, the techniques described herein relate to a non-transitory computer-readable medium wherein classifying, based on the one or more intermediate values, each pixel of at least some pixels of the image as the hazard tree pixel or as the non-hazard tree pixel includes applying a statistical function to the one or more intermediate values of each pixel of at least some pixels of the image.

In some aspects, the techniques described herein relate to a non-transitory computer-readable medium wherein generating, based on at least some of the hazard tree pixels, the multiple polygons includes determining multiple boundaries of the multiple polygons using morphological operations.

In some aspects, the techniques described herein relate to a non-transitory computer-readable medium, the method further including: receiving multiple locations of the multiple electrical assets; determining, based on the multiple locations of the multiple electrical assets, a first particular location for the particular electrical asset; and determining a second particular location for the particular polygon, wherein determining the distance from the particular polygon to the particular electrical asset includes determining, based on the first particular location and the second particular location, the distance from the particular polygon to the particular electrical asset.

In some aspects, the techniques described herein relate to a non-transitory computer-readable medium wherein the particular polygon is a first particular polygon, the height is a first height, the distance is a first distance, the particular electrical asset is a first particular electrical asset, the potential hazard is a first potential hazard, the notification is a first notification, and the method further including, for second particular polygons of the multiple polygons: determining second heights for the second particular polygons; comparing the second heights to a height threshold value; and for only the second particular polygons for which the second heights meet or exceed a height threshold value: determining second distances from the second particular polygons to second particular electrical assets of the multiple electrical assets; determining, based on the second heights and the second distances, that one or more second particular hazard trees corresponding to the second particular polygons represent second potential hazards to the second particular electrical assets; generating second notifications of the second potential hazards to the second particular electrical assets; and providing second notifications of the second potential hazards to the second particular electrical assets.

In some aspects, the techniques described herein relate to a method, including: receiving multiple images for a geographic area, the geographic area including multiple assets of a utility; identifying, using one or more trained models, multiple hazard trees in the multiple images; and for at least one hazard tree of the multiple hazard trees: determining at least one height of the at least one hazard tree; determining at least one distance between the at least one hazard tree and at least one asset of the multiple assets; determining, based on the at least one height and the at least one distance, that the at least one hazard tree is a potential hazard to the at least one asset; generating a notification of the potential hazard to the at least one asset; and providing the notification of the potential hazard to the at least one asset.

In some aspects, the techniques described herein relate to a method wherein identifying, using the one or more trained models, the multiple hazard trees in the multiple images includes: classifying, using one or more convolutional neural networks, at least some pixels of each image of the multiple images as hazard tree pixels or as non-hazard tree pixels; and identifying, based on at least some of the hazard tree pixels, the multiple hazard trees.

In some aspects, the techniques described herein relate to a method wherein classifying, using the one or more convolutional neural networks, at least some pixels of each image of the multiple images as the hazard tree pixels or as the non-hazard tree pixels includes: generating multiple probability data structures by processing the multiple images using the one or more convolutional neural networks, a probability data structure of the multiple probability data structures corresponding to an image of the multiple images and including, for each pixel of at least some pixels of the image, a probability value indicating a probability that the pixel is a portion of the multiple hazard trees; and generating multiple classification data structures based on the multiple probability data structures, a classification data structure corresponding to an image of the multiple images and including, for each pixel of at least some pixels of the image, a classification of the pixel as a hazard tree pixel or as a non-hazard tree pixel.

In some aspects, the techniques described herein relate to a method wherein generating the multiple classification data structures based on the multiple probability data structures includes, for each probability data structure of at least some of the multiple probability data structures: for each probability value of at least some of the probability values in the probability data structure: comparing the probability value to a threshold value; if the probability value is equal to or greater than the threshold value, classifying the pixel corresponding to the probability value as a hazard tree pixel; and if the probability value is less than the threshold value, classifying the pixel corresponding to the probability value as a non-hazard tree pixel; and generating a classification data structure that includes, for each pixel of at least some pixels of the image, the classification of the pixel as a hazard tree pixel or as a non-hazard tree pixel.

In some aspects, the techniques described herein relate to a method wherein classifying, using the one or more convolutional neural networks, at least some pixels of each image of the multiple images as the hazard tree pixels or as the non-hazard tree pixels includes, for each image of the multiple images: generating one or more transformed images by performing one or more transformations on the image; processing, by the one or more convolutional neural networks, the one or more transformed images to generate one or more intermediate values for each pixel of at least some pixels of the image; and classifying, based on the one or more intermediate values, each pixel of at least some pixels of the image as a hazard tree pixel or as a non-hazard tree pixel.

In some aspects, the techniques described herein relate to a method wherein generating the one or more transformed images by performing the one or more transformations on the image includes performing one or more of a rotation of the image, a flip of the image, a resizing of the image, and an addition of noise to the image.

In some aspects, the techniques described herein relate to a method wherein classifying, based on the one or more intermediate values, each pixel of at least some pixels of the image as the hazard tree pixel or as the non-hazard tree pixel includes applying a statistical function to the one or more intermediate values of each pixel of at least some pixels of the image.

In some aspects, the techniques described herein relate to a method wherein a pixel of an image of the multiple images has one or more intensity values, and the method further includes normalizing the one or more intensity values of each pixel of at least some pixels of each image of the multiple images.

In some aspects, the techniques described herein relate to a method, further including generating the one or more trained models by training one or more models using one or more generative adversarial networks.

In some aspects, the techniques described herein relate to a method, further including, for the at least one hazard tree, determining a risk posed to the at least one asset by the at least one hazard tree, wherein: generating the notification of the potential hazard to the at least one asset includes generating a user interface that includes the at least one asset and an indication of the risk to the at least one asset, and providing the notification of the potential hazard to the at least one asset includes providing the user interface.

In some aspects, the techniques described herein relate to a method wherein identifying the multiple hazard trees includes identifying the multiple hazard trees using morphological operations.

In some aspects, the techniques described herein relate to a system including at least one processor and memory containing executable instructions, the executable instructions being executable by the at least one processor to: receive multiple images for a geographic area, the geographic area including multiple assets of a utility; identify, using one or more trained models, multiple hazard trees in the multiple images; and for at least one hazard tree of the multiple hazard trees: determine at least one height of the at least one hazard tree; determine at least one distance between the at least one hazard tree and at least one asset of the multiple assets; determine, based on the at least one height and the at least one distance, that the at least one hazard tree is a potential hazard to the at least one asset; generate a notification of the potential hazard to the at least one asset; and provide the notification of the potential hazard to the at least one asset.

In some aspects, the techniques described herein relate to a system wherein the executable instructions being executable by the at least one processor to identify, using the one or more trained models, the multiple hazard trees in the multiple images includes executable instructions by the at least one processor to: classify, using one or more convolutional neural networks, at least some pixels of each image of the multiple images as hazard tree pixels or as non-hazard tree pixels; and identify, based on at least some of the hazard tree pixels, the multiple hazard trees.

In some aspects, the techniques described herein relate to a system wherein the executable instructions by the at least one processor to classify, using the one or more convolutional neural networks, at least some pixels of each image of the multiple images as the hazard tree pixels or as the non-hazard tree pixels includes executable instructions by the at least one processor to, for each image of the multiple images: generate one or more transformed images by performing one or more transformations on the image; process, by the one or more convolutional neural networks, the one or more transformed images to generate one or more intermediate values for each pixel of at least some pixels of the image; and classify, based on the one or more intermediate values, each pixel of at least some pixels of the image as a hazard tree pixel or as a non-hazard tree pixel.

In some aspects, the techniques described herein relate to a system wherein the executable instructions by the at least one processor to generate the one or more transformed images by performing one or more transformations on the image includes executable instructions by the at least one processor to perform one or more of a rotation of the image, a flip of the image, a resizing of the image, and an addition of noise to the image.

BRIEF DESCRIPTION OF THE DRAWINGS

FIGS. 4A and 4B depict example software code that may be utilized by the hazard tree identification system in some embodiments.

FIG. 7 depicts an image for a geographic area that may be utilized by the hazard tree identification system in some embodiments.

FIG. 10 depicts a representation of a classification data structure that the hazard tree identification system may have generated based upon processing the image of FIG. 7 in some embodiments.

FIG. 12 depicts a table containing hazard trees identified by the hazard tree identification system in some embodiments.

Throughout the drawings, like reference numerals will be understood to refer to like parts, components, and structures

DETAILED DESCRIPTION

One problem with manual inspection of electrical assets (e.g., transformers, poles, transmission lines, distribution lines, and/or the like) is the inability of utility personnel to inspect all vegetation that may impact functionality. The problem is compounded when the utility supports a huge amount of territory. Moreover, utility personnel often inspect utilities in poor conditions (for example, cold, heat, rain, snow, or the like). Further, utility personnel may not be sufficiently trained. For these reasons, manual inspection can be inaccurate, missing information, misleading, costly, and take considerable time. Inaccurate information, missing information, and delays can also create unanticipated risks of wildfires and service failure which can lead to widespread damage and loss of life.

Accordingly, it would be advantageous to have scalable systems and methods for identifying hazardous trees and determining whether such trees are potential hazards to utility assets such as transmission lines and distribution lines. It would be further advantageous to be able to classify utility assets according to the risks to the utility assets posed by hazard trees.

Various embodiments of a hazard tree identification system and associated methods and non-transitory computer-readable media as described herein may provide technical solutions to these and other technical problems. The hazard tree identification system may process images of geographic areas that include electrical assets of utilities to identify hazard trees. In some embodiments, the hazard tree identification system may determine heights of hazard trees, distances of the hazard trees to electrical assets, and other attributes of hazard trees. The hazard tree identification system may use this and other information to determine whether or not hazard trees represent potential hazards to the electrical assets. In some embodiments, the hazard tree identification system also determines classifications or categories of risk for the electrical assets.

It will be appreciated that various embodiments of the hazard tree identification system and associated methods and non-transitory computer-readable media correct problems caused by current approaches or technology. For example, current approaches or technologies may result in not identifying certain hazard trees or not appropriately categorizing the risk to electrical assets posed by hazard trees.

Figure 1:
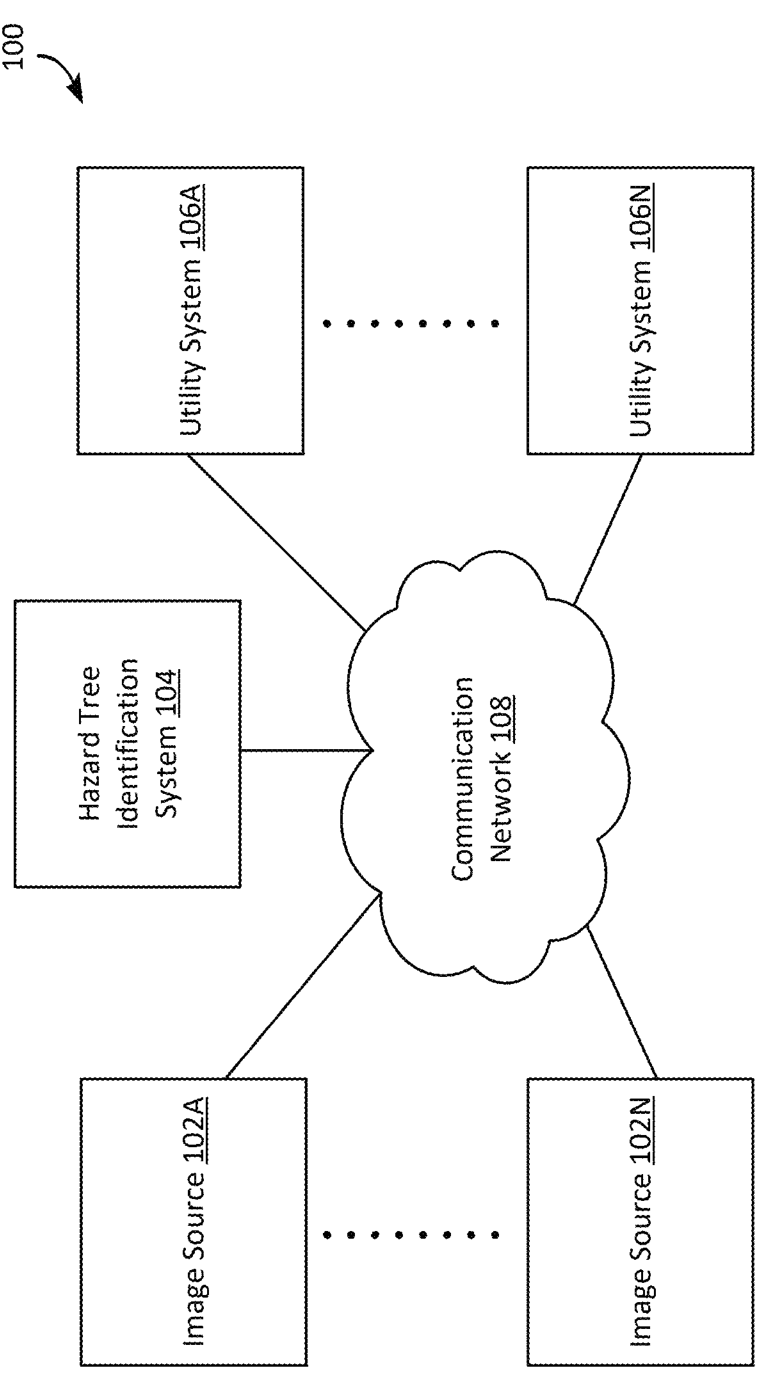
FIG. 1 depicts an example environment in which a hazard tree identification system may operate in some embodiments.

FIG. 1 depicts an example environment 100 in which a hazard tree identification system may operate in some embodiments. The environment 100 includes multiple image sources 102A through 102N (which may be referred to as an image source 102 or as image sources 102), multiple utility systems 106A through 106N (which may be referred to as a utility system 106 or as utility systems 106), a hazard tree identification system 104, and a communication network 108. Each of the image sources 102, the hazard tree identification system 104, and the utility systems 106 may be or include any number of digital devices. A digital device is any device with at least one processor and memory. Digital devices are discussed further herein, for example, with reference to FIG. 15.

Image sources 102A to 102N may each be a third party system configured to provide images or access to images. Different third parties may periodically capture images of geographic areas. For example, some third parties may obtain images of geographic areas from satellites, airplanes, helicopters, and/or drones at regular intervals or on-demand for a variety of purposes. Satellite images are images of Earth collected by imaging satellites operated by governments and businesses. Different third parties may obtain images from different sources (for example, different satellites, airplanes, helicopters, drones, or the like) for the same and/or different geographic regions. An example of a third party that captures, collects, and/or provides images covering geographic regions is Airbus. The third parties may provide images and/or license access to the images to other businesses for a variety of purposes (e.g., via one or more image sources 102A-102N).

Figure 3A:
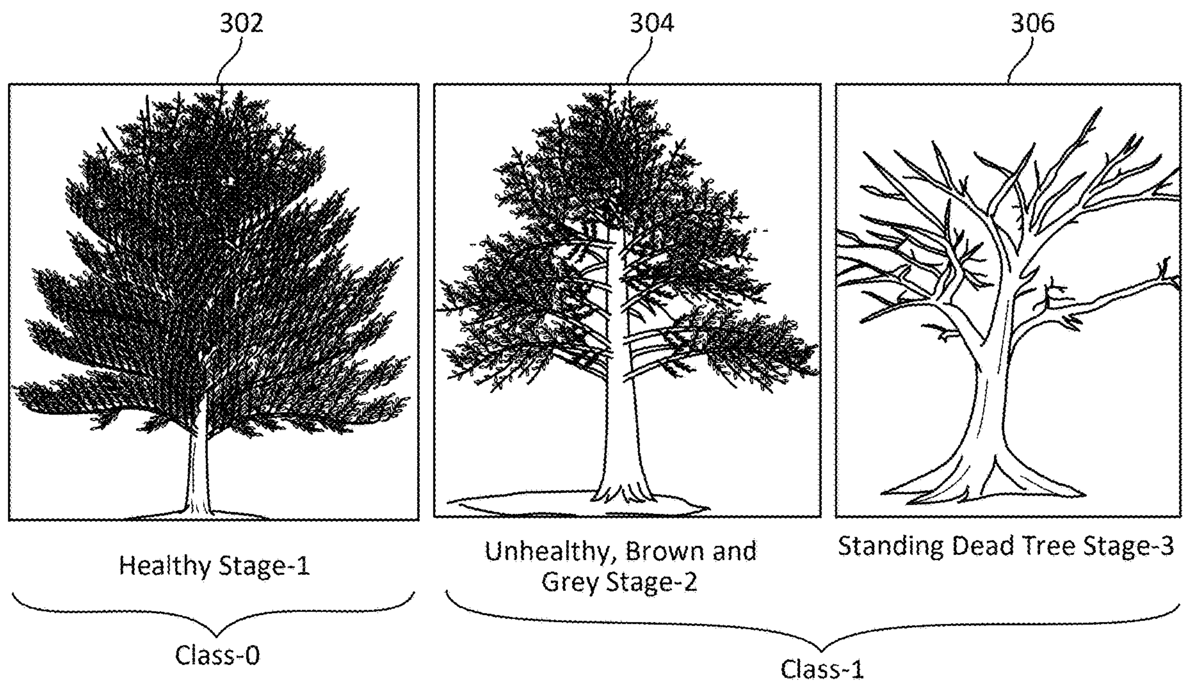
FIG. 3A depicts trees at various stages and at various classifications determined by the hazard tree identification system in some embodiments.
Figure 3C:
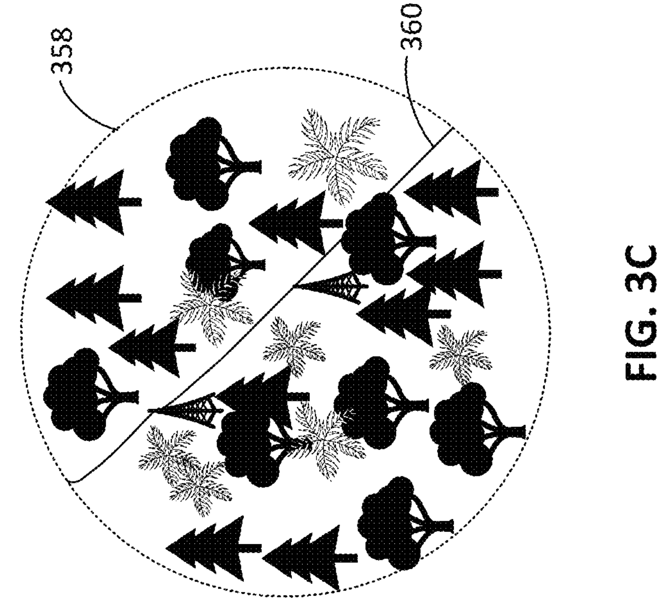
FIG. 3C depicts a zoomed-in portion of the geographic area of FIG. 3B.
Figure 3B:
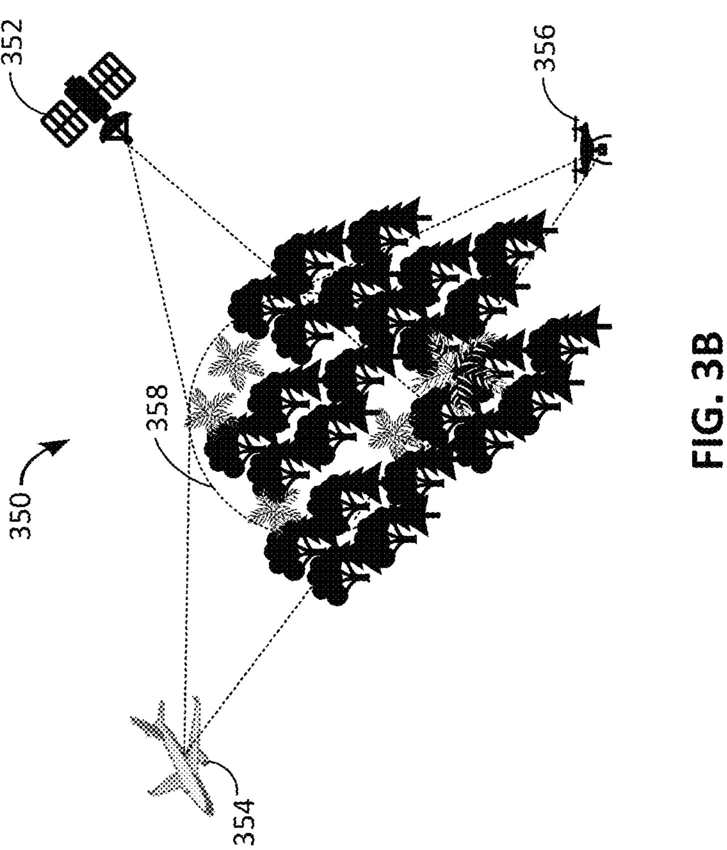
FIG. 3B depicts a geographic area where electrical assets may be located in some embodiments.

FIG. 3B depicts a geographic area 350 where electrical assets may be located in some embodiments. Images of the geographic area may be captured by, for example, a satellite 352, an aircraft 354, and/or a drone 356. Captured images and/or other information (e.g., geographic coordinates and the like) may be stored and provided to others via one or more image sources 102A-102N.

FIG. 3C depicts an example zoomed-in portion 358 of the geographic area 350 of FIG. 3B, containing an electrical asset 360, which includes an electrical powerline, such as a transmission line or a distribution line. As discussed further herein with reference to, for example, FIG. 5, the hazard tree identification system 104 may calculate distances between electrical assets, such as the electrical asset 360, and vegetation proximate to electrical assets, such as hazard trees.

Returning to FIG. 1, in some embodiments, any number of the image sources 102A-N may obtain images of the same geographic area (e.g., from satellites, aircraft, and/or drones) and save them over time. As such, an image source 102A may obtain and store images of the same geographic site taken on different days, months, or years. For example, an image source 102A may provide images at a first duration of time (for example, taken at a particular time and date). The image source 102A may also provide images of the same geographic areas for a second duration (for example, taken at a different particular time or date, such as one or more years before or after the first duration).

Any number of the image sources 102A-N may provide application programming interfaces (APIs) to enable another system (for example, the hazard tree identification system 104) to request images for a particular geographic area (for example, all or part of a geographic region). The request may be or include a request for current images and/or for images of the same geographic areas taken at different times. In various embodiments, the hazard tree identification system 104 may request information on what geographic area images are available and at what time frames. A geographic area may be any portion of the surface of the earth. In various embodiments described herein, a geographic area includes assets. For example, electrical assets of a power distribution infrastructure, alternatively referred to as an electrical network infrastructure, may be in a geographic area.

The hazard tree identification system 104 may be configured to receive images of any number of geographic areas. The hazard tree identification system 104 may utilize the images to identify hazard trees that may interfere with the safety and operation of assets of a local distribution network and/or a high-voltage distribution network (which alone or together may be referred to herein as an electrical network). An asset of an electrical network may include, for example, one or more transmission lines, distribution stations, feeder lines, circuit spans, segments, poles, transformers, substations, towers, switches, relays, and/or the like (which may be referred to herein as electrical assets).

The hazard tree identification system 104 may be described herein as identifying hazard trees. It will be appreciated that the hazard tree identification system 104 may identify any hazardous vegetation, including any number of different types of vegetation (not just trees but also including shrubs, bushes, vines, and/or the like).

In various embodiments, the hazard tree identification system 104 may enhance, orient, and analyze (for example, using artificial intelligence (AI) and/or machine learning (ML) systems) geographic images to identify trees and/or vegetation in the images. In some embodiments, the hazard tree identification system 104 may estimate the heights of trees, their crown areas, their volumes, and/or their densities. The hazard tree identification system 104 may plot the vegetation (such as trees) on maps and/or provide shapefiles that include information regarding vegetation, such as the location, shape, and attributes of vegetation. Such shapefiles may be utilized in Geographic Information System (GIS) software.

In various embodiments, the hazard tree identification system 104 may request current satellite images from third parties, such as businesses or governments that operate imaging satellites, and utilize the images to identify hazard trees. The hazard tree identification system 104 may request other satellite, airplane, helicopter, and/or drone images for the same geographic areas from the same and/or different image sources (e.g., image sources 102A-102N), combine the images from different image sources for the same geographic areas and then analyze the information to identify potential threats to electrical assets and/or other information.

Utilizing satellite, airplane, helicopter, and/or drone images provides significant advantages over manual viewing from the ground. For example, in addition to case in obtaining the images, it will be appreciated that satellite images may have sufficient spatial resolution (e.g., 30 centimeters (cm)×30 cm) for evaluating vegetation such as trees. The spatial resolution may refer to the size of a geographic area on the Earth represented by one pixel of the satellite image. For example, a 30 cm×30 cm spatial resolution may mean each pixel of the satellite image represents a 900 square centimeter area.

Different aerial or satellite images may have different spatial resolutions. In one example, a set of satellite images has a spatial resolution of 50 cm×50 cm. In some embodiments, satellite images have spatial resolutions other than 30 cm×30 cm and 50 cm×50 cm. The hazard tree identification system 104 may utilize satellite images that have spatial resolutions ranging from approximately 5 cm×5 cm to approximately 50 cm×50 cm. Due to cost constraints and/or image availability, the hazard tree identification system 104 may receive images of the same area with different spatial resolutions. The hazard tree identification system 104 may modify certain satellite images to conform to a standard resolution.

In some embodiments, the hazard tree identification system 104 may utilize artificial intelligence and/or machine learning, such as a trained convolutional neural network (CNN), to improve the quality of captured images using histogram modification, contrast enhancement, and/or bilinear interpolation to generate high-resolution images from low-resolution images. U.S. patent application Ser. No. 17/160,231 filed on Jan. 27, 2021, and entitled "SYSTEM AND METHOD OF INTELLIGENT VEGETATION MANAGEMENT," describes such utilization of artificial intelligence and/or machine learning and is incorporated in its entirety herein by reference.

Satellite images may be captured using red-green-blue (RGB) bands as well as an infrared (IR) band. The cost of satellite imagery may be high. Accordingly, images captured using other image capture forms may be considered. In some terrains, such as residential areas with many mature trees obscuring transmission lines, a spatial resolution lower than 30 cm×30 cm may be insufficient. The cost of satellite imagery may make this imagery solution too expensive and prohibitive. To obtain images of terrains with a spatial resolution of higher than 30 cm×30 cm may require other forms of image capture, such as drones. Drones, however, may have a limited flight time, and therefore, the area of the physical environment captured by drones may be less than that of a satellite.

Images may also be captured using an airplane, sometimes referred to as aviation photography, or by a helicopter, a drone, or other airborne vehicle. Similar to satellite images, images captured using airplanes, helicopters, drones, and the like (generally referred to as aerial images) may be licensed or captured on-demand by private companies. Aerial images may have a higher spatial resolution than satellite images and may provide another source of digital images for the hazard tree identification system 104.

To account for the differences in image capture angles resulting from different forms of image capture, such as satellites, airplanes, helicopters, and drones, the hazard tree identification system 104 may receive images of the same area captured by different image capture methods. In some embodiments, the hazard tree identification system 104 may utilize images from different methods of image capture to correct for different image capture angles, enhance the information contained within the images, and add information for more accurate analysis. The hazard tree identification system 104 may utilize artificial intelligence and/or machine learning algorithms or models to correct the image capture angles, which may distort objects captured in the images.

In various embodiments, due to environmental factors such as cloud coverage, smoke, or fog, a satellite may require more than one flyover to capture satellite images, or an airplane, helicopter and/or drone may require more than one pass to capture aerial images of a particular area. The hazard tree identification system 104 may utilize artificial intelligence and/or machine learning algorithms or models to recognize features on each of the multiple images of the particular area. Similarly, the hazard tree identification system 104 may utilize artificial intelligence and/or machine learning algorithms or models, such as a CNN, to improve the quality of captured images by using contrast enhancement. In some embodiments, the hazard tree identification system 104 may receive satellite imagery of the same area over several years and use that information to estimate the growth of trees in that area and generate an estimate of a future schedule of vegetation management. Vegetation management may include any activity pertaining to vegetation proximate to utility assets, such as inspection, removal, and pruning.

In various embodiments, the hazard tree identification system 104 may correlate utility equipment and/or transmission line location information with images captured using various forms of image capture to identify an estimated location of electrical assets (e.g., utility equipment or transmission lines). The hazard tree identification system 104 may receive this information from the utility system 106. In one embodiment, the hazard tree identification system 104 may determine the location of transmission lines or utility equipment using feature recognition of an artificial intelligence and/or machine learning model.

In some embodiments, if the estimated height of vegetation such as a hazard tree is generally greater than or equal to a distance between the tree and an electrical asset, the hazard tree identification system 104 may identify the vegetation as a potential hazard and provide a notification to the utility system 106 of the potentially hazardous vegetation. In some embodiments, the hazard tree identification system 104 may rank the geographic areas contained within a geographic region based on the potentially hazardous vegetation and the facilities served by the utility system 106 (for example, residences, businesses, government and/or public health facilities) that are within the geographic areas. The hazard tree identification system 104 may provide notifications of the ranked geographic areas to the utility system 106.

The utility system 106 may be responsible for the management, control, and/or alerts regarding a power distribution infrastructure, also referred to as an electrical network infrastructure. A power distribution infrastructure may be or include any network of transmission lines, including electrical assets for the generation, transmission, and distribution of electricity. An electrical asset may be or include any component of the electrical network, including, for example, transmission lines, distribution stations, feeder lines, circuit spans, segments, poles, transformers, substations, towers, switches, relays, and/or the like. In some embodiments, the utility system 106 may be operated by a utility company that owns the utility equipment and/or transmission lines, such as the Pacific Gas and Electricity Company (PG&E). It will be appreciated that there can be any number of utility systems 106. Although FIG. 1 depicts a utility system 106, it will be appreciated that there may not be a utility system 106 but any system (or any number of different utility systems management by any number of related or unrelated entities) that tracks or enables management of vegetation, debris, or other asset care.

Although electrical networks are specifically discussed herein, it will be appreciated that embodiments discussed herein may be applied to any infrastructure, including, for example, gas lines, pipelines, buildings, roads, highways, and/or the like.

In some embodiments, the communication network 108 may represent one or more computer networks (for example, LAN, WAN, and/or the like). The communication network 108 may provide communication between any of the image sources 102, the hazard tree identification system 104, and any of the utility systems 106. In some implementations, the communication network 108 comprises computer devices, routers, cables, and/or other network topologies. In some embodiments, the communication network 108 may be wired and/or wireless. In various embodiments, the communication network 108 may comprise the Internet, one or more networks that may be public, private, IP-based, non-IP based, and so forth.

Figure 2:
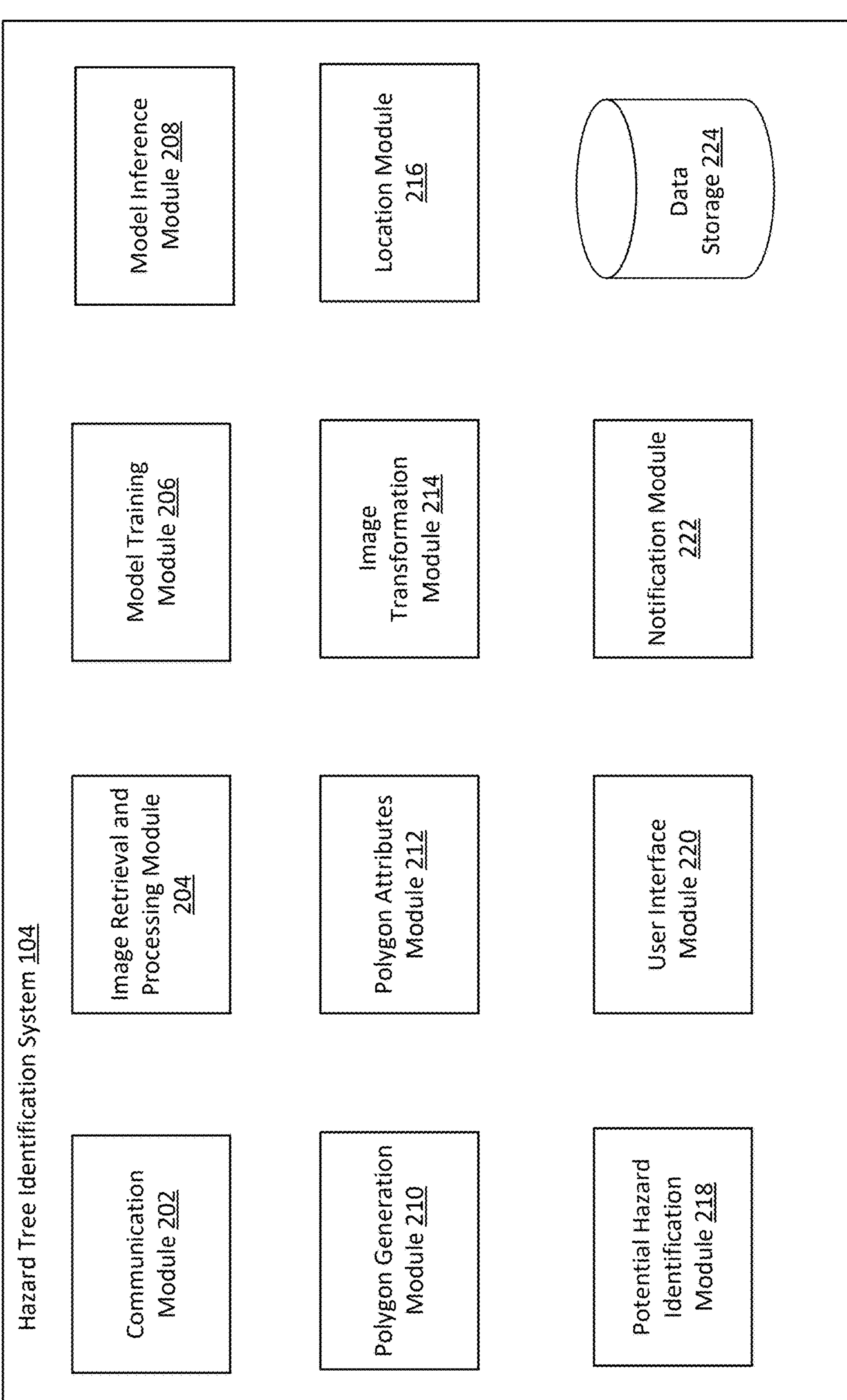
FIG. 2 depicts a block diagram of the hazard tree identification system in some embodiments.

FIG. 2 depicts a block diagram of the hazard tree identification system 104 according to some embodiments. The hazard tree identification system 104 includes a communication module 202, an image retrieval and processing module 204, a model training module 206, a model inference module 208, a polygon generation module 210, a polygon attributes module 212, an image transformation module 214, a location module 216, a potential hazard identification module 218, a user interface module 220, a notification module 222, and a data storage 224.

The communication module 202 may send and receive requests or data between any of the image sources 102, the hazard tree identification system 104, and any of the utility systems 106. The communication module 202 may receive a request from a user of the hazard tree identification system 104 (for example, via an interface) to request images from the image source 102. In some embodiments, the communication module 202 may provide an interface or information for a remote interface to enable a third party (for example, a utility, a vegetation management company, workers, supervisors, contractors, insurance companies, and/or the like) to view and manage vegetation and other safety activities.

In some embodiments, the image retrieval and processing module 204 may retrieve images or video from any number of multiple image sources 102. In one example, an image source 102 may provide satellite, aerial and/or ground-level images and video. The images or video may be captured by different devices, such as satellites, airplanes, drones, image capture devices, surveillance cameras, and the like. Commercially available satellite images from businesses that operate imaging satellites may provide a user interface or a web link to download satellite images of specific geographic areas.

In various embodiments, the image retrieval and processing module 204 may interact with one or more of the image sources 102 to retrieve different images of the same geographic area and/or different geographic areas. For example, the image retrieval and processing module 204 may retrieve one set of images taken by satellite(s) of a geographic area that is available through one image source 102 and other images taken by an airplane of the same geographic area that is available through another image source 102.

In some embodiments, the image retrieval and processing module 204 may request images based on a geographic area (for example, the coordinates of the geographic area), location information, date ranges, quality (for example, high quality or based on resolution), enhancement, orientation, and/or the like.

In various embodiments, the image retrieval and processing module 204 may provide an Application Programming Interface (API) call to a software application that provides satellite images. In some embodiments, the image retrieval and processing module 204 may receive enhanced and aligned images from a satellite image source. In various embodiments, the image retrieval and processing module 204 may determine if images require enhancement. In some embodiments, the image retrieval and processing module 204 may utilize computer vision techniques and deep learning models to determine if the quality of images may be improved.

In some embodiments, the image retrieval and processing module 204 may optionally scan any number of images, remove noise, remove undesired markings provided by the service, improve accuracy, balance or remove color, or the like. In some embodiments, the spatial resolution of images captured by the different image sources 102 is different. The image retrieval and processing module 204 may utilize techniques such as histogram equalization, contrast enhancement, bilinear interpolation, or some combination thereof to generate high-resolution images from low-resolution images and/or to standardize image resolutions.

The image retrieval and processing module 204 may also process images to normalize intensity values of pixels of the images to a standard range. The image retrieval and processing module 204 may also process images by calculating various statistical measures of intensity values (for example, 50th percentile and/or 90th percentile of intensity values).

The model training module 206 may train one or more artificial intelligence (AI) and/or machine learning (ML) models. In some embodiments, the model training module 206 may train a fully convolutional neural network (which may also be referred to as a fully convolutional segmentation model). In embodiments where the one or more AI and/or ML models include one or more fully convolutional neural networks, the one or more fully convolutional neural networks may be based on a UNet architecture which includes an encoder and a decoder. The encoder may utilize a backbone (for example, ResNet50v2) that has been trained on images from an ImageNet dataset, which may include millions of images. The decoder may include five layers of a convolutional neural network that may be up sampled using nearest point interpolation.

The model inference module 208 may perform inference on images for a geographic area using the one or more AI and/or ML models trained by the model training module 206. For example, the model inference module 208 may utilize a deep learning convolutional neural network (CNN) model which classifies pixels of an image as hazard tree pixels or as non-hazard tree pixels to perform inference. The model inference module 208 may also generate data structures as outputs of the inference.

The polygon generation module 210 may generate polygons that represent or correspond to hazard trees based on hazard tree pixels classified by the model inference module 208. The polygon attributes module 212 may determine metrics for polygons, such as heights, areas, distances to utility assets, and/or other metrics.

The image transformation module 214 may transform images to generate one or more transformed images. For example, the image transformation module 214 may rotate an image to obtain a rotated image. The model inference module 208 may perform inference on such transformed images to obtain values for the pixels of the images. The image transformation module 214 may undo or reverse the effect of the transformation on the values. For example, where the model inference module 208 performed inference on a transformed image that had been rotated 90 degrees clockwise, the image transformation module 214 may rotate the values 90 degrees counterclockwise.

The location module 216 may map polygons to a georeferenced coordinate system. For example, the location module 216 may perform transformations on polygons using an appropriate projection matrix. The location module 216 may also map assets of electrical utilities.

The potential hazard identification module 218 may determine, based on attributes of polygons, such as heights and distances to electrical assets, whether or not the hazard trees corresponding to the polygons represent potential hazards to the electrical assets. In some embodiments, the potential hazard identification module 218 also determines risks posed to electrical assets by such hazard trees. The potential hazard identification module 218 may determine an amount or extent of a risk and/or a classification of the risk.

In some embodiments, the user interface module 220 may generate user interfaces that include electrical assets and indications of risks to the electrical assets that hazard trees may pose. The notification module 222 may generate notifications of identifications of hazard trees as potential hazards to electrical assets. The notification module 222 may also provide notifications to systems such as the utility systems 106.

In various embodiments, the data storage 224 includes data stored, accessed, and/or modified by any of the modules of the hazard tree identification system 104. The data storage 224 may be or include any data structures, such as tables, lists, databases, and/or any other structures.

A module of the hazard tree identification system 104 may be hardware, software, firmware, or any combination. For example, each module may include functions performed by dedicated hardware (for example, an Application-Specific Integrated Circuit (ASIC), a Field Programmable Gate Array (FPGA), or the like), software, instructions maintained in ROM, and/or any combination. Software may be executed by one or more processors. Although a limited number of modules are depicted in FIG. 2, there may be any number of modules. Further, individual modules may perform any number of functions, including functions of multiple modules as described herein.

FIG. 3A depicts trees at various stages and at various classifications determined by the hazard tree identification system in some embodiments. In one example, a healthy tree 302 may be at a first stage and the hazard tree identification system 104 may classify pixels of an image (for example, a satellite image or an aerial image) of the healthy tree 302 as zero (0), which may refer to non-hazard tree pixels. A first hazard tree 304 may be at a second stage and a second hazard tree 306 may be at a third stage. In this example, the hazard tree identification system 104 may classify at least some pixels of an image of the first hazard tree 304 and at least some pixels of an image of the second hazard tree 306 as one (1), which may refer to hazard tree pixels. It will be appreciated that the hazard tree identification system 104 may utilize other values (for example, values other than zero (0) or one (1)) for classifications of pixels of images of trees. In some embodiments, images may be associated with values between zero and one.

The hazard tree identification system 104 may utilize one or more artificial intelligence (AI) and/or machine learning (ML) models to identify hazard trees from images, such as satellite images with a 30 cm resolution. For example, the hazard tree identification system 104 may utilize one or more convolutional neural networks (CNNs) and/or one or more fully convolutional neural networks (FCNNs) to process images for purposes of identifying hazard trees. A CNN and/or FCNN may be based on a U-Net architecture and may include an encoder and a decoder. In various embodiments, the encoder may be derived from a Resnet50V2 model that has been trained on an ImageNet dataset. In some embodiments, the decoder may include five layers of blocks, and the hazard tree identification system 104 may up-sample the blocks using nearest point interpolation. One advantage of using nearest point interpolation is that it may improve reliability of the CNN and/or FCNN model for images of a wider range of geographic areas. In some embodiments, the hazard tree identification system 104 may up-sample the blocks using transposed convolution.

The hazard tree identification system 104 may utilize one or more generative adversarial networks (GANs) to train the CNN and/or FCNN against adversarial noise and to provide improved generalisability for images of a wider range of geographic areas. The hazard tree identification system 104 may improve the one or more GANs using a combination of a Lovasz-Softmax loss and a cross-entropy loss. One advantage of utilizing a Lovasz-Softmax loss is that it is a tractable surrogate for intersection over union (IoU) measure as compared to a dice loss which corresponds to a per-pixel loss. Since the hazard trees may be small in size on images with 30 cm resolution or lower, IoU loss used in this training strategy may allow the hazard tree identification system 104 to ignore noise in the labelled dataset and at the same time provide inferences that may provide higher quality instance segmentation of hazard trees. In some embodiments, the hazard tree identification system 104 may utilize only a Lovasz-Softmax loss. In one example, a function for cross-entropy loss that the hazard tree identification system 104 may utilize is given by equation (1):

$$L_{CE}(y, \hat{y}) = -\sum_i \omega_i[y_i \log \hat{y}_i + (1 - y_i)\log(1 - \hat{y}_i)] \tag{1}$$

In equation (1), $\omega$ may be the weights per pixel, $y_i$ may be the ground truth pixel values and $\hat{y}_i$ may be the model predictions.

The hazard tree identification system 104 may calculate weights per image to emphasize the edges of the hazard trees that are to be detected via the model. In some embodiments, the hazard tree identification system 104 may calculate the weights by: 1) finding boundaries of polygons using morphological operations to produce another image/and 2) convolving image/with a gaussian kernel which the hazard tree identification system 104 then scales by a constant parameter to produce a weights image W containing weights $\omega_i$. FIG. 4A depicts example software code 400 that the hazard tree identification system 104 may utilize to calculate the weights $\omega_i$ in various embodiments. FIG. 4B depicts example software code 450 that the hazard tree identification system 104 may utilize in calculating a Lovasz-Softmax loss in various embodiments.

In some embodiments, the hazard tree identification system 104 may utilize only a cross-entropy loss. In various embodiments, the hazard tree identification system 104 may, additionally or alternatively, utilize other loss functions.

Figure 5:
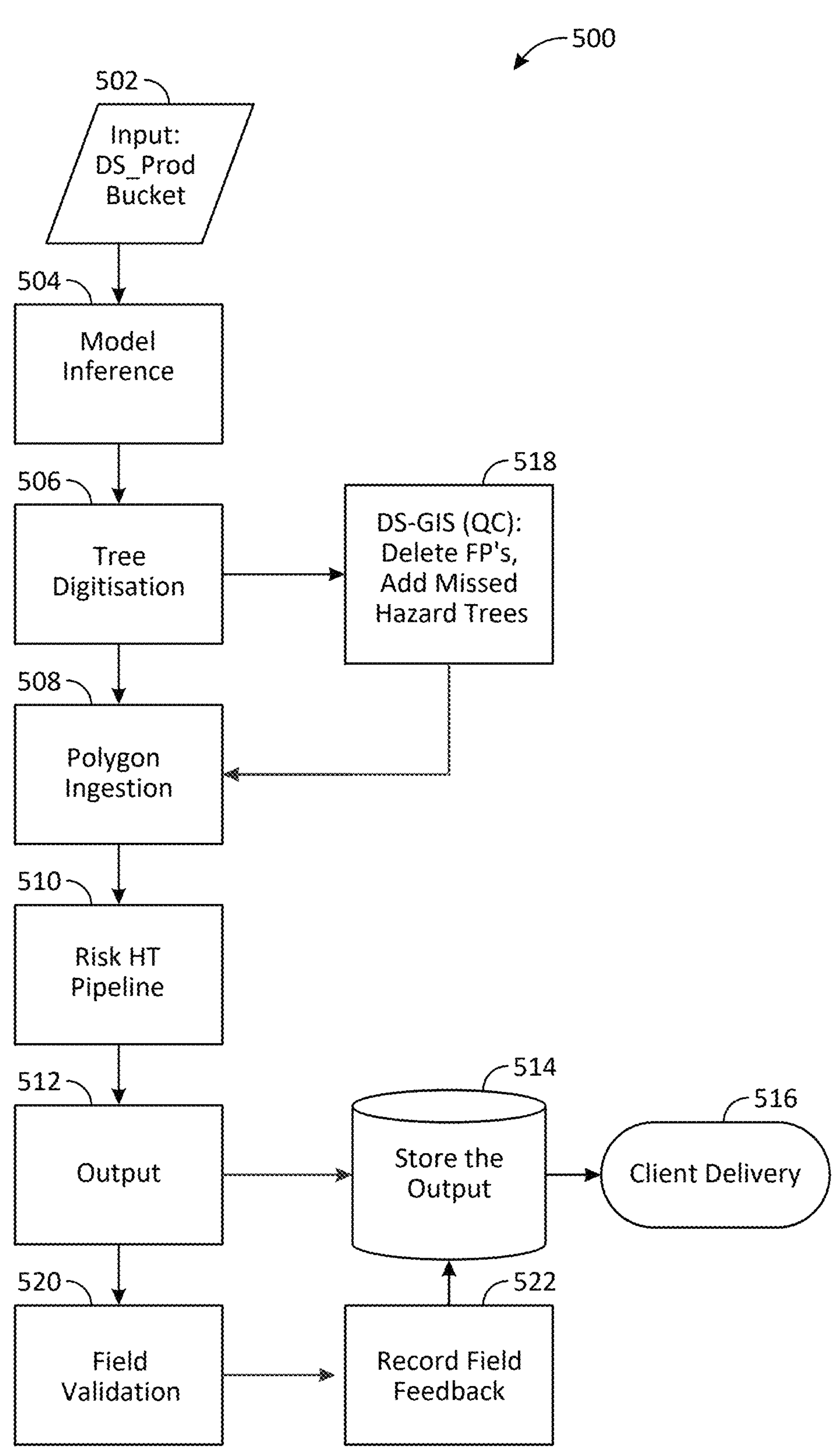
FIG. 5 is a diagram depicting a method for identifying hazard trees in some embodiments.

FIG. 5 is a diagram depicting a method 500 for identifying hazard trees in some embodiments. The hazard tree identification system 104 (for example, various modules of the hazard tree identification system 104) may perform the method 500. The method 500 may begin at step 502 where the hazard tree identification system 104 (for example, the image retrieval and processing module 204) receives images for a geographic area. FIG. 7 depicts an example image 700 for a geographic area that may be utilized by the hazard tree identification system 104 in some embodiments. The image 700 includes multiple trees, some of which may be hazard trees. The hazard trees may have characteristics of being dead or unhealthy, such as missing foliage, browned or greyed foliage, greyed limbs or trunks, and/or the like. Such characteristics may be visible, by virtue of their color and/or texture, in images like the image 700.

In some embodiments, the images are images captured by one or more satellites and are georeferenced. Such images may be referred to herein as georeferenced satellite images. A georeferenced satellite image, which may be in the form of a rectangle, may include the coordinates of the top-left vertex and the bottom-right vertex of the rectangle and have a resolution, such as a 30 cm×30 cm spatial resolution. Accordingly, the coordinates of each pixel in the georeferenced satellite image may be determined using the vertex coordinates and the resolution of the georeferenced satellite images.

The georeferenced satellite images may be mono, where a satellite captures one image of a particular area. Alternatively, the georeferenced satellite images may be stereo, where the satellite captures two images of a particular area from two different angles at approximately the same time. The geographic area may include multiple electrical assets of a power distribution infrastructure, such as transmission towers, utility poles, and transmission or distribution lines between utility poles and/or transmission towers (which may be referred to herein as a span).

Returning to FIG. 5, in some embodiments, after receiving the images, the hazard tree identification system 104 (for example, the image retrieval and processing module 204) may process the images for the geographic area. For example, an image may include multiple channels, such as a red channel, a green channel, and a blue channel. Each pixel of the image may have an intensity value for each of the multiple channels. The intensity values may range from zero (0) to 255 or from zero (0) to another value (for example, 4,096) for each channel. The hazard tree identification system 104 may normalize the intensity values of pixels of the image so that, for each pixel, the pixel has an intensity value for each channel of the multiple channels that ranges between zero (0) and one (1).

Figures 8A, 8B:
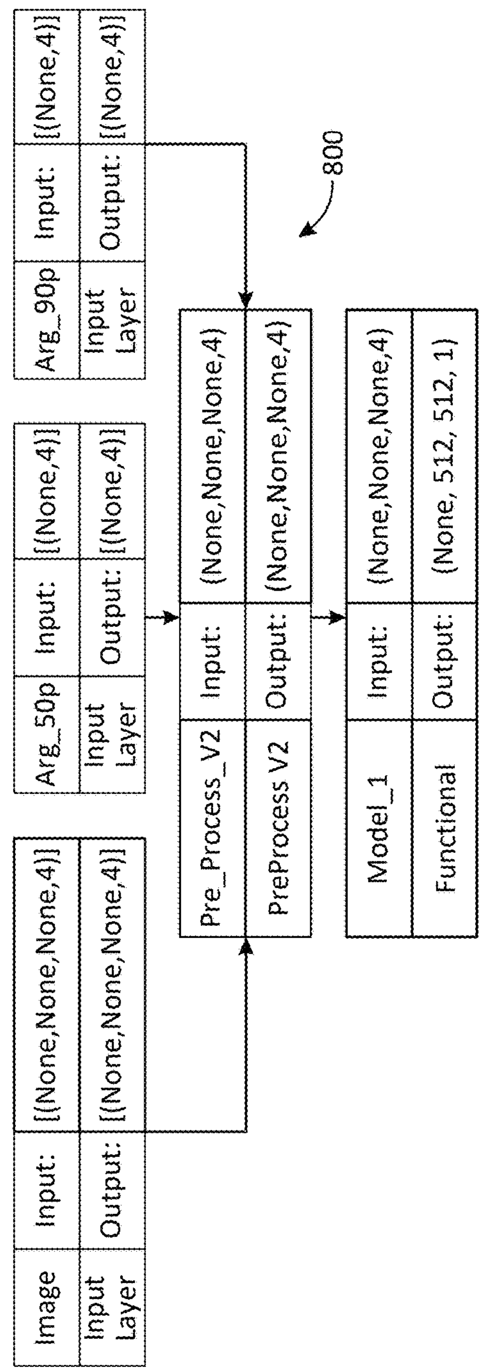
FIG. 8A depicts an example processing block for processing images according to some embodiments.
FIG. 8B depicts an example test-time augmentation framework that the hazard tree identification system may utilize in some embodiments.

In some embodiments, the hazard tree identification system 104 may process the images for a geographic area by calculating a 50th percentile of intensity values and a 90th percentile of intensity values. The hazard tree identification system 104 may use the 50th percentile of intensity values and the 90th percentile of intensity values that the hazard tree identification system 104 had previously calculated for the multiple images. FIG. 8A depicts an example processing block 800 for processing images according to some embodiments. In the processing block 800 the hazard tree identification system 104 utilizes the 50th percentile of intensity values and the 90th percentile of intensity values. In some embodiments, the processing block 800 may include a TensorFlow optimized layer to batch process images. The hazard tree identification system 104 may have stored the 50th percentile of intensity values and the 90th percentile of intensity values in the data storage 224 and retrieve them from the data storage 224. The hazard tree identification system 104 may process images in other ways, such as by resizing the images, cropping the images, modifying the resolution of images, and/or other ways.

Figure 9:
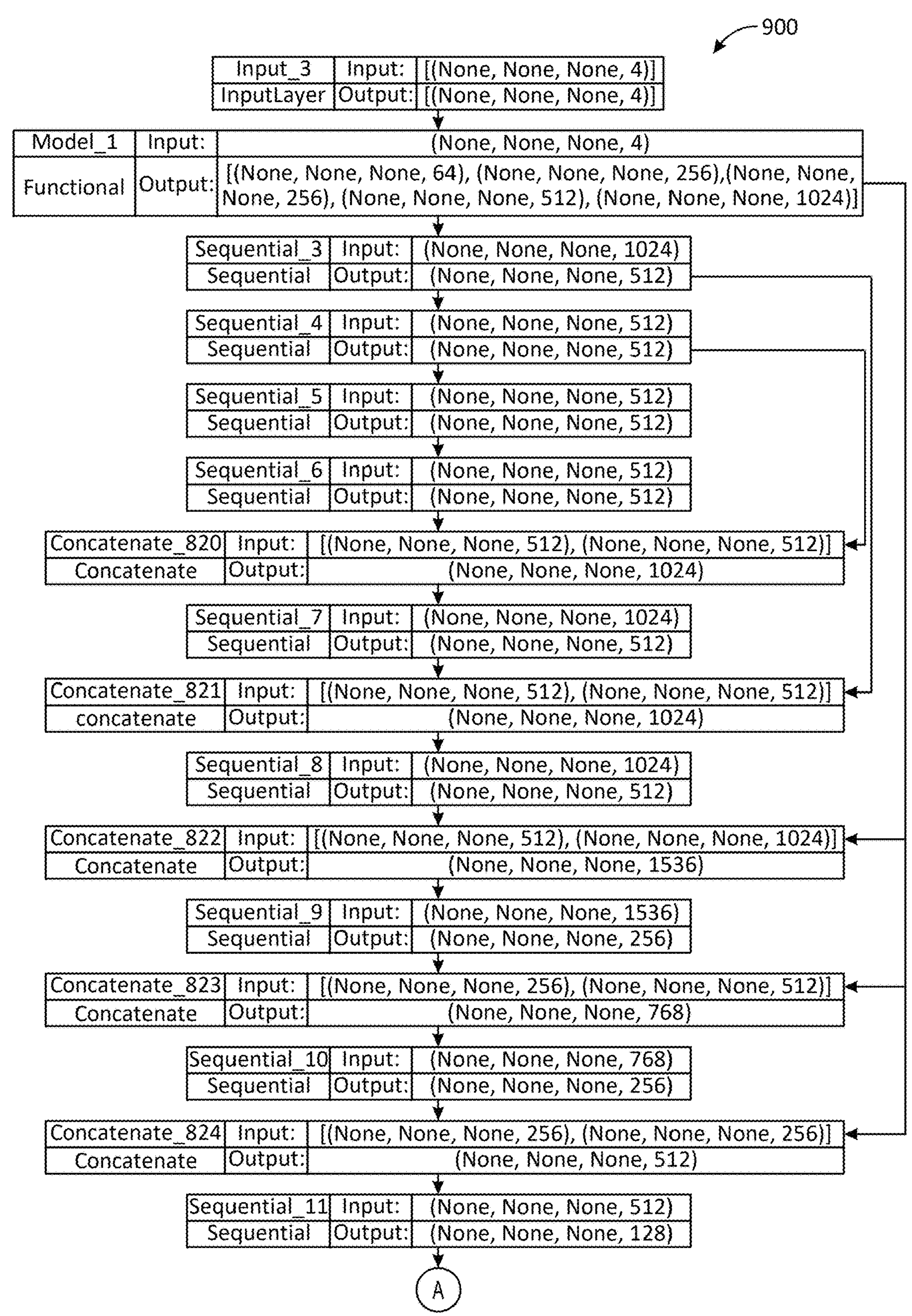
FIG. 9 depicts an example convolutional neural network that the hazard tree identification system may utilize to classify pixels of images in some embodiments.
Figure 9:
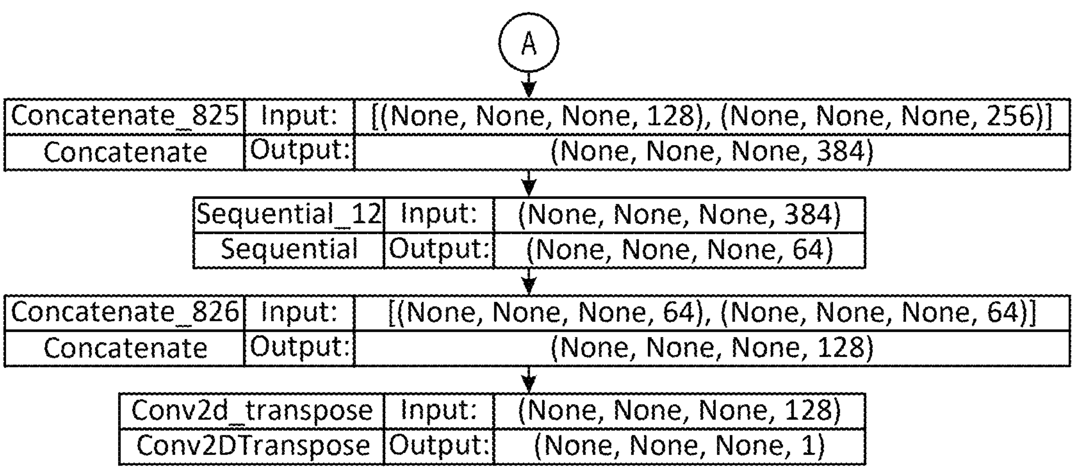

Returning to FIG. 5, at step 504, the hazard tree identification system 104 (for example, the model inference module 208) may perform inference on the images for the geographic area. In some embodiments, the hazard tree identification system 104 classifies, using one or more trained AI and/or ML models (for example, using one or more convolutional neural networks and/or one or more fully convolutional neural networks) the pixels of each image of the multiple images as hazard tree pixels or non-hazard tree pixels. FIG. 9 depicts an example convolutional neural network 900 that the hazard tree identification system 104 may utilize to classify pixels of images in some embodiments. The convolutional neural network 900 may include an encoder and a decoder that is based upon a U-net architecture. The encoder may be derived from a ResNet50V2 model where outputs of intermediate layers are used as the output of the encoders.

In some embodiments, the hazard tree identification system 104 utilizes a test-time augmentation framework to classify pixels of images. FIG. 8B depicts an example test-time augmentation framework 850 that the hazard tree identification system 104 may utilize in some embodiments. The test-time augmentation framework may include an augmentation layer, one or more trained AI and/or ML models (for example, the U-Net encoder and decoder layers of the convolutional neural network 900 of FIG. 9), and a de-augmentation layer. Test-time augmentation may allow for capturing the output of the one or more trained AI and/or ML models under different conditions. In some embodiments, the hazard tree identification system 104 (for example, the image transformation module 214) performs test-time augmentation on an image by performing one or more transformations on the image to generate one or more transformed images, which may be referred to as augmentation. The one or more transformations of the image that the hazard tree identification system 104 may perform on the image may include one or more rotations of the image (for example, 90 degrees clockwise, 90 degrees counter-clockwise, or 180 degrees), one or more flips of the image (for example, about the horizontal axis of the image or about the vertical axis of the image), one or more of resizing the image (for example, to a smaller size and/or a larger size), and one or more additions of noise to the image.

The hazard tree identification system 104 (for example, the model inference module 208) may then process the one or more transformed images and the image using the one or more trained AI and/or ML models to generate one or more first intermediate values for each pixel of the image. The hazard tree identification system 104 (for example, the image transformation module 214) may then modify the one or more first intermediate values so as to undo the effect of the one or more transformations on the image, thereby obtaining one or more second intermediate values. For example, where the hazard tree identification system 104 has rotated an image 90 degrees clockwise, the hazard tree identification system 104 may rotate the second intermediate values 90 degrees counterclockwise. The hazard tree identification system 104 undoing the effect of the one or more transformations may be referred to as de-augmentation. The hazard tree identification system 104 may then apply a statistical function on the one or more second intermediate values to obtain third intermediate values. For example, the hazard tree identification system 104 may average the one or more second intermediate values to obtain the third intermediate values. The hazard tree identification system 104 may then classify each pixel of the image based on the third intermediate values as either a hazard tree pixel or as a non-hazard tree pixel.

One output of the hazard tree identification system 104 classifying pixels of an image using one or more trained AI and/or ML models may include a probability data structure that has dimensions that are sized the same as the dimensions of the image. For example, the probability data structure may have the same number of rows as the width of the image in pixels and the same number of columns as the height of the image in pixels. The probability data structure may include, for each pixel of the image, a probability value that indicates a probability that the pixel is of a portion of a hazard tree. In some embodiments, the probability value may be between zero (0) and one (1). The hazard tree identification system 104 may generate multiple probability data structures by processing the multiple images using the one or more trained AI and/or ML models.

In some embodiments, the hazard tree identification system 104 (for example, the model inference module 208) may generate multiple classification data structures based on the multiple probability data structures. A classification data structure may have dimensions that are sized the same as the dimensions of the image (for example, the classification data structure may have the same number of rows as the width of the image in pixels and the same number of columns as the height of the image in pixels). The hazard tree identification system 104 may generate a classification data structure by iterating through a probability data structure and comparing each probability value to a threshold value (for example, 0.5). If the hazard tree identification system 104 determines that the probability value is equal to or greater than the threshold value, the hazard tree identification system 104 may classify the pixel corresponding to the probability value as a hazard tree pixel. If the hazard tree identification system 104 determines that the probability value is less than the threshold value, the hazard tree identification system 104 may classify the pixel corresponding to the probability value as a non-hazard tree pixel. The hazard tree identification system 104 may generate a classification data structure that includes, for each pixel of the image, the classification of the pixel as a hazard tree pixel or as a non-hazard tree pixel. The hazard tree identification system 104 may generate a classification data structure for each image of the multiple images, thereby generating multiple classification data structures.

FIG. 10 depicts a representation 1000 of a classification data structure that the hazard tree identification system 104 may have generated based upon processing the image 700 of FIG. 7. The hazard tree identification system 104 may have generated a probability data structure by processing the image 700 using the one or more trained AI and/or ML models. The hazard tree identification system 104 may have generated the classification data structure based upon the probability data structure. The classification data structure corresponds to the image 700 and may include, for each pixel of the image 700, a classification of the pixel as a hazard tree pixel or as a non-hazard tree pixel. The representation 1000 includes multiple collections of hazard tree pixels, such as a first collection 1002*a*, a second collection 1002*b*, and a third collection 1002*c*. Each collection 1002 corresponds to one or more hazard trees in the image 700.

Returning to FIG. 5, the hazard tree identification system 104 may, at step 506, digitize hazard trees using the hazard tree pixels classified in step 504. For example, the hazard tree identification system 104 (for example, the polygon generation module 210) may generate multiple polygons based on the hazard tree pixels, where a polygon corresponds to one or more hazard trees in an image. For a polygon, the hazard tree identification system 104 may identify or determine a set of coordinates that define the polygon. In some embodiments, the hazard tree identification system 104 may utilize morphological operations to find boundaries of a polygon. For example, the hazard tree identification system 104 may remove noisy pixels using morphological operations, which may reduce false positives. U.S. patent application Ser. No. 18/167,830, filed Feb. 10, 2023 and entitled SYSTEMS AND METHODS FOR IDENTIFYING TREES AND ESTIMATING TREE HEIGHTS AND OTHER TREE PARAMETERS, describes techniques for digitizing trees and is incorporated in its entirety by reference herein. The hazard tree identification system 104 (for example, the location module 216) may map the polygons to a georeferenced coordinate system by transforming the geometry of the polygons with an appropriate projection matrix.

Figure 11:
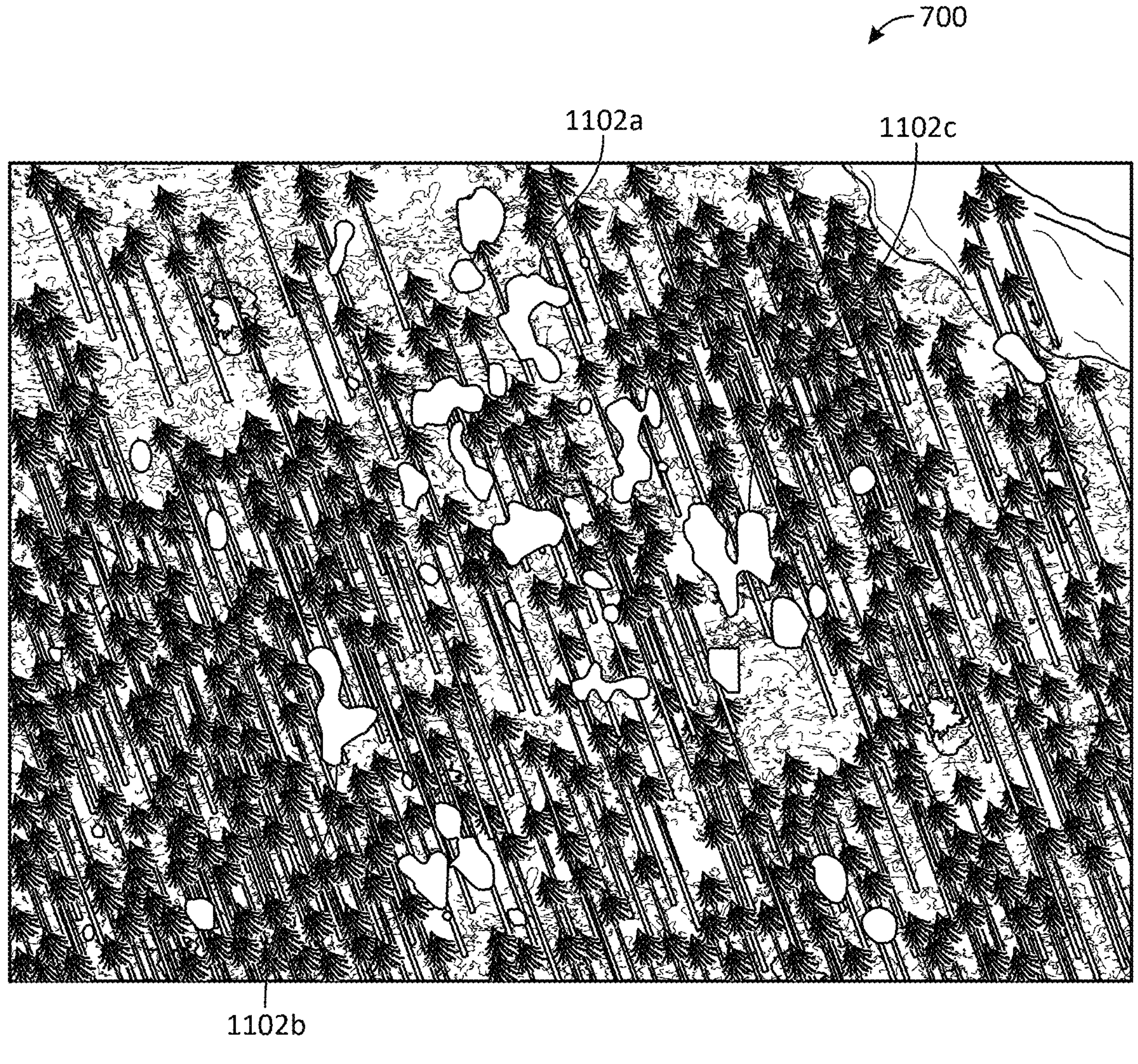
FIG. 11 depicts polygons representing hazard trees superimposed on the image of FIG. 7 that may be generated by the hazard tree identification system in some embodiments.

FIG. 11 depicts polygons representing hazard trees superimposed on the image 700 of FIG. 7 that may be generated by the hazard tree identification system 104 in some embodiments. The polygons include a first polygon 1102*a*, a second polygon 1102*b*, and a third polygon 1102*c*. Each of the polygons 1102 corresponds to or represents one or more hazard trees in the image 700. It will be appreciated that the first polygon 1102*a* corresponds to or represents the first collection 1002*a* of FIG. 10, and that the second polygon 1102*b* corresponds to or represents the second collection 1002*b* and the third polygon 1102*c* corresponds to or represents the third collection 1002*c*, both also of FIG. 10. The hazard tree identification system 104 has generated the polygons 1102 based on the collections 1002.

Returning to FIG. 5, also at step 506, the hazard tree identification system 104 (for example, the polygon attributes module 212) may determine or identify metrics for the multiple polygons. For example, for a polygon, the hazard tree identification system 104 may determine a two-dimension area of the polygon using the set of coordinates that define the polygon. The hazard tree identification system 104 may also apply a statistical function to the probabilities of the pixels of the polygon to determine a value. For example, the hazard tree identification system 104 may average the probabilities of the pixels of the polygon to determine an average probability (a mean probability) for the polygon. The hazard tree identification system 104 may also assign one or more unique identifiers to the polygon.

In various embodiments, after the hazard tree identification system 104 has digitized hazard trees, at step 518 one or more quality checks may be performed to remove false positives and correct false negatives. The performance of a quality check may include a person reviewing representations of classification data structures and images received at step 502 in some embodiments. In various embodiments, the hazard tree identification system 104 may perform the quality check by, for example, comparing classification data structures with ground truth determinations of hazard trees to ensure that the numbers or percentages of false positives and the numbers or percentages of false negatives are within appropriate ranges and/or do not meet or exceed appropriate values.

At step 508 the hazard tree identification system 104 (for example, the polygon attributes module 212) may receive the multiple polygons generated at step 506. At step 510 the hazard tree identification system 104 (for example, the polygon attributes module 212) may determine heights of polygons. In some embodiments, the hazard tree identification system 104 may utilize one or more canopy height models (CHMs) to determine the heights of the polygons. The hazard tree identification system 104 may generate the one or more CHMs using the techniques described in the above-referenced U.S. patent application Ser. No. 18/167,830. Additionally or alternatively, the hazard tree identification system 104 may obtain the one or more CHMs from one or more of the image sources 102.

For a polygon corresponding to or representing one or more hazard trees, the hazard tree identification system 104 may utilize the one or more CHMs to determine a height for each pixel of the polygon. The hazard tree identification system 104 may then determine one or more metrics for the polygon based upon the heights of each pixel encompassed by the polygon. For example, the hazard tree identification system 104 may determine an average (mean), a 50th percentile, an 85th percentile, a 90th percentile, a 95th percentile, and/or the like. The hazard tree identification system 104 may assign one or more of the metrics to the polygon as one or more heights of the polygon.

In various embodiments, the hazard tree identification system 104 (for example, the polygon attributes module 212) may filter out polygons whose height do not meet or exceed a height threshold value. The hazard tree identification system 104 may filter out such polygons because the corresponding hazard trees are considered to be not tall enough to be a potential hazard to electrical assets. In some embodiments, the hazard tree identification system 104 does not filter out polygons based on heights.

Also at step 510, for a polygon, the hazard tree identification system 104 (for example, the polygon attributes module 212) may determine one or more distances between the polygon and one or more electrical assets of the power distribution infrastructures. For example, the hazard tree identification system 104 may determine a distance between each pixel of the polygon and each pixel of each electrical asset proximate to the polygon. The hazard tree identification system 104 may utilize bounding boxes around an electrical asset to determine which polygons are proximate to the electrical asset and only determine distances to the electrical asset for those polygons. For example, the hazard tree identification system 104 may utilize bounding boxes that have borders that are approximately 150 feet from the electrical asset to determine which polygons are proximate to the electrical asset. The hazard tree identification system 104 may determine multiple distances from the polygon to an electrical asset.

Also at step 510, the hazard tree identification system 104 (for example, the potential hazard identification module 218) may, for the electrical asset, determine whether or not the one or more hazard trees are a potential hazard to the electrical asset. The hazard tree identification system 104 may utilize a height of the polygon (for example, the mean height of the pixels of the polygon) and a distance from the polygon to the electrical asset (for example, the shortest horizontal distance from the polygon to the electrical asset). The hazard tree identification system 104 may also, for the electrical asset, determine a risk posed to the electrical asset by one or more hazard trees corresponding to or represented by the polygon that the hazard tree identification system 104 has determined is proximate to the electrical asset. For example, the hazard tree identification system 104 may determine an amount of or an extent of the risk that the one or more hazard trees may fall into the electrical asset. In some embodiments, the hazard tree identification system 104 classifies the particular electrical asset as at one of low risk, medium risk, and high risk based on various metrics of the one or more hazard trees.

In various embodiments, the hazard tree identification system 104 may utilize the following method to determine an amount or extent of a risk to an electrical asset posed by a hazard tree. The hazard tree identification system 104 may calculate a radial distance from the tree to the electrical asset using a horizontal distance from the hazard tree to the electrical asset and a height of the hazard tree. The hazard tree identification system 104 may utilize the height of the tallest pixel of the hazard tree as the height of the hazard tree. If the hazard tree identification system 104 determines that the radial distance is smaller than the height of the hazard tree, then the hazard tree identification system 104 may determine that the hazard tree poses a high fall-in risk to the electrical asset. In such a case, the hazard tree identification system 104 classifies the electrical asset as at high risk. An example of a fall-in risk is that the hazard tree may fall into or onto the electrical asset, such as during or after a storm.

If the hazard tree identification system 104 determines that there are no hazard trees whose radial distances are smaller than their heights, the hazard tree identification system 104 may determine that any hazard trees that are still within a predetermined zone surrounding or bounding the electrical asset pose a medium fall-in risk to the electrical asset. In such cases, the hazard tree identification system 104 may classify the electrical asset as at medium risk. For example, the hazard tree identification system 104 may classify a span as at medium risk if there is at least one hazard tree within a 150 foot zone on either side of the span.

If there are no hazard trees within the predetermined zone surrounding or bounding the electrical asset, the hazard tree identification system 104 may classify the electrical asset as at low risk. It should be noted that an electrical asset may have its risk classification changed or modified based on other factors, such as proximity to healthy trees or length in time from last trim cycle.

The hazard tree identification system 104 may utilize one or more heights of the one or more hazard trees, one or more distances to the electrical asset, a number of the one or more hazard trees, and/or other metrics to classify the risk to the electrical asset. For example, the hazard tree identification system 104 may classify the electrical asset as at low risk if there are no hazard trees whose heights are greater than the distances from the hazard trees to the electrical asset. As another example, the hazard tree identification system 104 may classify the electrical asset as at medium risk if there is only one hazard tree whose height is greater than the distance from the hazard tree to the electrical asset. As another example, the hazard tree identification system 104 may classify the electrical asset as at high risk if there is more than one hazard tree whose heights are greater than the distances from the hazard trees to the electrical asset.

In some embodiments, the hazard tree identification system 104 may utilize other metrics as an alternative to or in addition to heights and distances to determine risks and/or classify risks posed by one or more hazard trees to an electrical asset. The various metrics may include an area of a polygon corresponding to one or more hazard trees, a mean probability of the pixels classified as hazard tree pixels of the polygon, and a height of the highest pixel of the polygon. It will be appreciated that the hazard tree identification system 104 may utilize various metrics and/or various methods to determine risks and/or classify risks.

The hazard tree identification system 104 may, at step 512, determine, identify, collect, and/or generate one or more metrics as an output for the hazard trees that the hazard tree identification system 104 has identified. FIG. 12 depicts a table 1200 that the hazard tree identification system 104 has generated in some embodiments. The table 1200 contains metrics for hazard trees that the hazard tree identification system 104 has identified. The metrics may include, for each hazard tree, an area of the hazard tree, a unique identifier of the hazard tree, a unique identifier of a feeder of which an electrical asset is a part, a unique identifier of an electrical asset (for example, a span) to which the hazard tree poses a risk, a mean height of the hazard tree, and an 85th percentile height of the hazard tree. The metrics may also include a distance from the hazard tree to the electrical asset, and a mean probability of the pixels of the hazard tree. The hazard tree identification system 104 may determine, identify, collect, and/or generate one or more metrics other than those disclosed herein for the hazard trees.

Returning to FIG. 5, at step 514, the hazard tree identification system 104 may store the output, such as in the data storage 224. At step 516 the hazard tree identification system 104 (for example, the notification module 222) may generate one or more notifications of the potential hazards posed by one or more hazard trees to one or more electrical assets and provide the one or more notifications. For example, the hazard tree identification system 104 may provide the one or more notifications to a utility system 106. In various embodiments, the hazard tree identification system 104 provides the table 1200 of FIG. 12 as a notification.

Figure 13:
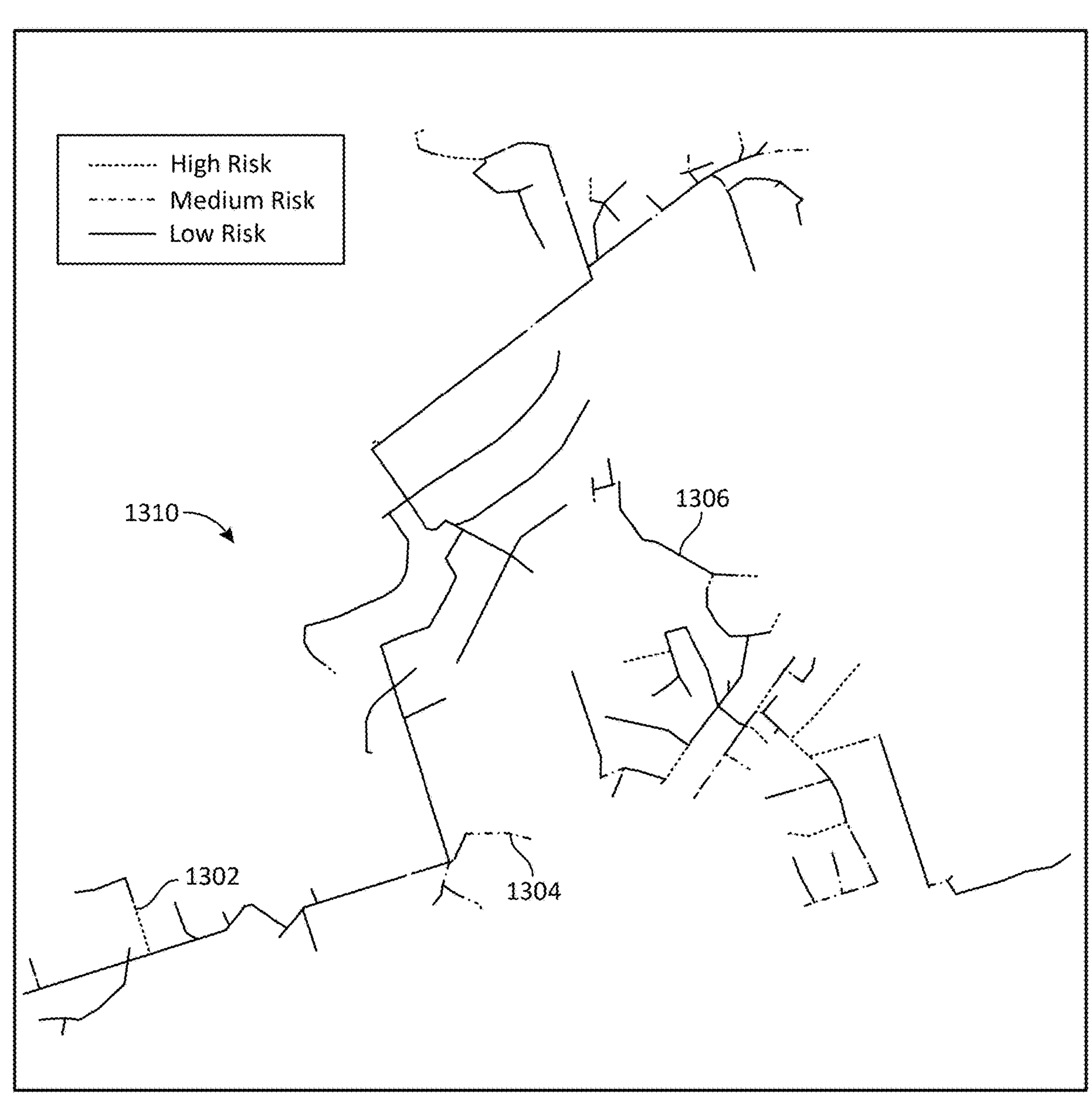
FIG. 13 depicts an example user interface that the hazard tree identification system may generate and provide in some embodiments.

In some embodiments, the hazard tree identification system 104 (for example, the user interface module 220) generates a user interface that includes one or more electrical assets and one or more indications of one or more risks to the one or more electrical assets. FIG. 13 depicts an example user interface 1300 that the hazard tree identification system 104 may generate in some embodiments. The user interface 1300 includes a representation 1310 of a power distribution infrastructure containing multiple electrical assets-spans. The hazard tree identification system 104 has classified the multiple spans according to the risks posed by one or more hazard trees identified by the hazard tree identification system 104. The hazard tree identification system 104 has classified a span 1302 as at high risk from one or more hazard trees proximate to the span 1302. The hazard tree identification system 104 has classified a span 1304 as at medium risk from one or more hazard trees proximate to the span 1304. The hazard tree identification system 104 has classified a span 1306 as at low risk from one or more hazard trees proximate to the span 1306. The hazard tree identification system 104 may color-code the spans according to their classifications. For example, a span may be colored red if it is classified as at high risk, blue if it is classified as at medium risk, and green if it is classified as at low risk.

The hazard tree identification system 104 may provide the user interface 1300 as part of providing a notification of potential hazards to electrical assets. The hazard tree identification system 104 may provide the user interface 1300 in conjunction with a map view that allows for scrolling, zooming, adding and removing overlays, and other common map view functions. The user interface 1300 may allow a user to select a span. In response to receiving a selection of a span, the hazard tree identification system 104 may show the one or more hazard trees that represent a potential hazard to the selected span and details about the one or more hazard trees, such as height, area, species, volume, or other metrics. The hazard tree identification system 104 may also provide information about when the vegetation management operations were last performed about the selected span. In some embodiments, the hazard tree identification system 104 may allow a user to commence and submit a work order for vegetation management operations for the selected span. In various embodiments, the hazard tree identification system 104 may automatically submit work orders for trimming operations for high-risk spans or other high-risk electrical assets.

In some embodiments, the hazard tree identification system 104 may generate a shapefile that includes identifications of hazard trees, detection probabilities, heights, and/or other metrics. The hazard tree identification system 104 may provide the shapefile to the utility system 106 so that the shapefile may be used by Geographic Information System (GIS) programs that the utility operating the utility system 106 utilizes.

Returning to FIG. 5, in various embodiments, field validation of the identification of hazard trees by the hazard tree identification system 104 may be performed at step 520. For example, an employee of a utility may confirm in the field that a tree identified as a hazard by the hazard tree identification system 104 is indeed a hazard and that it poses a risk to an electrical asset. The field validation may be recorded at step 522 and the hazard tree identification system 104 may store the field validation at step 514 in, for example, the data storage 224. The hazard tree identification system 104 may utilize the field validation to assist in future training of the one or more AI and/or ML models. One advantage of utilizing field validations may be in the reduction of future false positives and/or false negatives by the hazard tree identification system 104.

Figure 6:
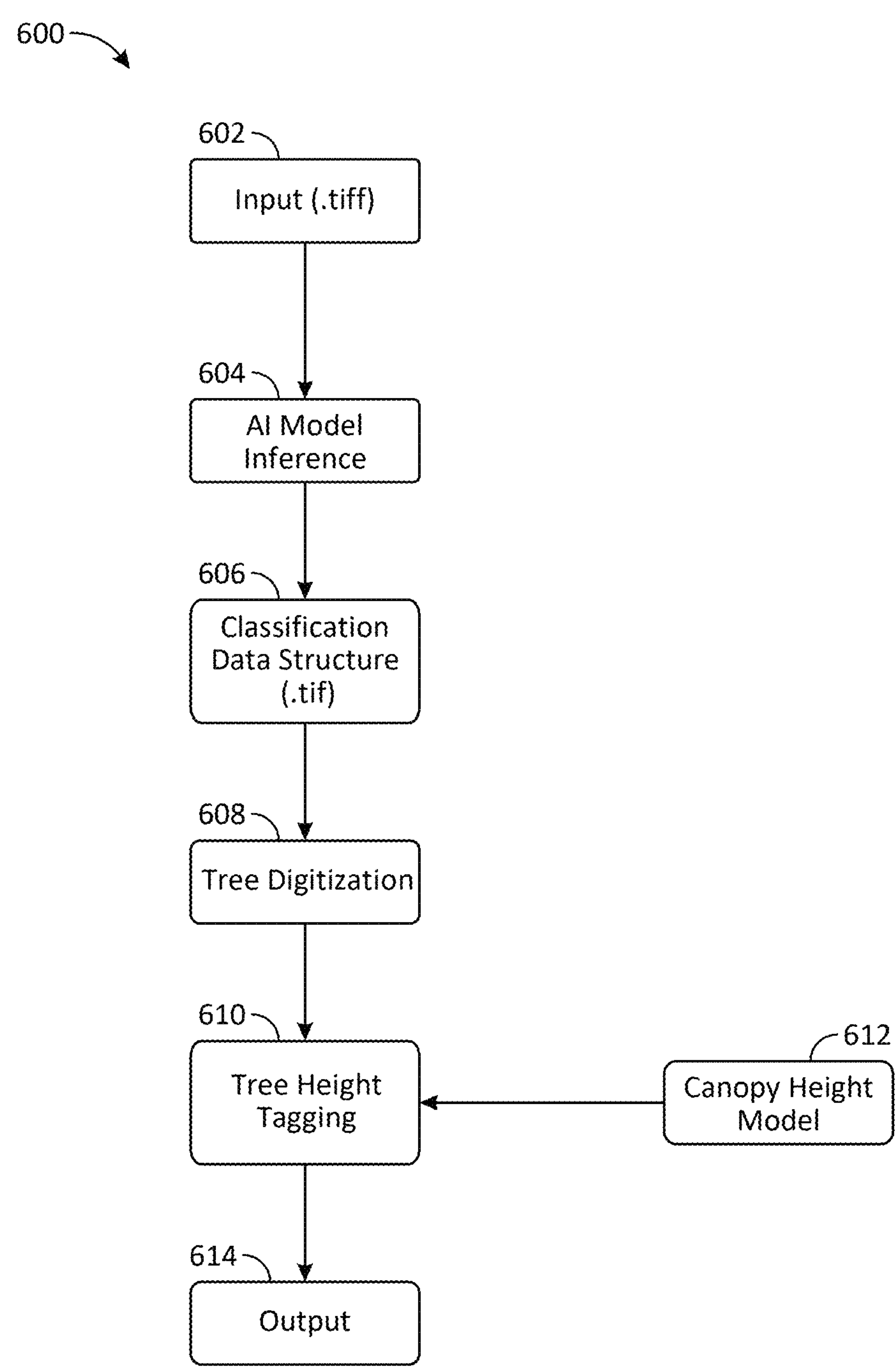
FIG. 6 is a diagram depicting another method for identifying hazard trees in some embodiments.

FIG. 6 is a diagram depicting a method 600 for identifying hazard trees in some embodiments. The hazard tree identification system 104 (for example, various modules of the hazard tree identification system 104) may perform the method 600. The method 600 may begin at step 602 where the hazard tree identification system 104 (for example, the image retrieval and processing module 204) receives images for a geographic area. The hazard tree identification system 104 may process the images as described in step 502 of the method 500, or the images may have already been processed as described in step 502 of the method 500, such as by a different system. At step 604 the hazard tree identification system 104 (for example, the model inference module 208) may perform inference using the images received in step 602. At step 606 the hazard tree identification system 104 may generate a representation of a classification data structure.

At step 608 the hazard tree identification system 104 may digitize hazard trees using the classification data structure. The hazard tree identification system 104 may generate a shapefile that includes polygons representing hazard trees and probability attributes for the polygons. The shapefile may encompass all or a portion of the geographic area for the images received in step 602. At step 610 the hazard tree identification system 104 may assign heights to hazard trees using one or more canopy height models 612. Also at step 610 the hazard tree identification system 104 may determine distances between hazard trees and electrical assets. The hazard tree identification system 104 may also determine whether or not hazard trees represent potential hazards to the electrical assets based on the heights and distances. In some embodiments, the hazard tree identification system 104 may also, at step 610, determine risks posed to the electrical assets by the hazard trees.

At step 614 the hazard tree identification system 104 may generate and provide an output. In various embodiments, the output includes a shapefile with identifications of hazard trees, detection probabilities, heights, and/or other metrics. In some embodiments, the hazard tree identification system 104 may generate a table similar to the table 1200 depicted in FIG. 12 and/or a user interface similar to the user interface 1300 depicted in FIG. 13 as the output. The hazard tree identification system 104 may provide the output to, for example, a utility system 106.

Figure 14:
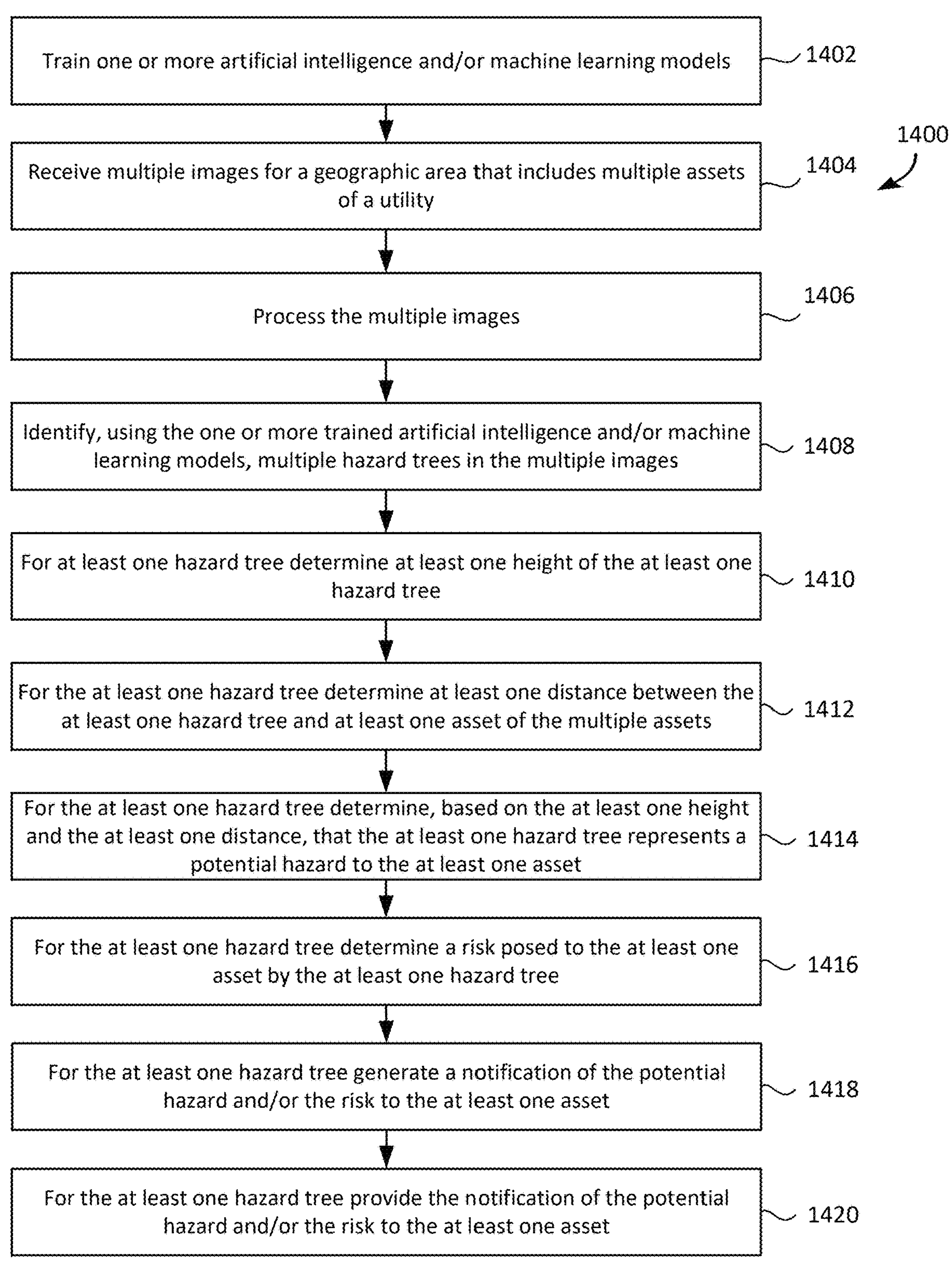
FIG. 14 is a flow diagram depicting a method for identifying hazard trees in some embodiments.

FIG. 14 is a flow diagram depicting a method 1400 for identifying hazard trees in some embodiments. The hazard tree identification system 104 (for example, various modules of the hazard tree identification system 104) may perform the method 1400. The method 1400 may begin at step 1402 where the hazard tree identification system 104 (for example, the model training module 206) may train one or more artificial intelligence and/or machine learning models. For example, the hazard tree identification system 104 may train one or more fully convolutional neural networks and/or convolutional neural networks as described herein.

At step 1404 the hazard tree identification system 104 (for example, the image retrieval and processing module 204) receives multiple images for a geographic area that includes multiple assets of a utility, such as multiple electrical assets (for example, spans) of an electrical power utility. At step 1406 the hazard tree identification system 104 (for example, the image retrieval and processing module 204) may process the multiple images. For example, the hazard tree identification system 104 may normalize the intensity values of each pixel of each image of the multiple images (for example, to be a value between zero (0) and one (1)). The hazard tree identification system 104 may process the multiple images using other techniques, such as those described herein.

At step 1408 the hazard tree identification system 104 (for example, the model inference module 208) identifies, using the one or more trained artificial intelligence and/or machine learning models, multiple hazard trees in the multiple images. The hazard tree identification system 104 may identify hazard trees using the techniques described herein (for example, classifying pixels of images as hazard tree pixels or as non-hazard tree pixels and digitizing hazard trees based on the hazard tree pixels).

The hazard tree identification system 104 (for example, the polygon attributes module 212) may, at step 1410, for at least one hazard tree of the multiple hazard trees, determine at least one height of the at least one hazard tree. For example, the hazard tree identification system 104 may use one or more canopy height models (CHMs) to determine the at least one height of the at least one hazard tree. At step 1412 the hazard tree identification system 104 (for example, the polygon attributes module 212) may, for the at least one hazard tree, determine at least one distance between the at least one hazard tree and at least one asset of the multiple assets. The hazard tree identification system 104 may determine the at least one distance as described herein.

At step 1414 the hazard tree identification system 104 (for example, the potential hazard identification module 218) may, for the at least one hazard tree, determine, based on the at least one height and the at least one distance, that the at least one hazard tree represents a potential hazard to the at least one asset. At step 1416 the hazard tree identification system 104 (for example, the potential hazard identification module 218) may, for the at least one hazard tree, determine a risk posed to the at least one asset by the at least one hazard tree. The hazard tree identification system 104 may determine the potential hazard and/or the risk as described herein.

At step 1418 the hazard tree identification system 104 (for example, the notification module 222) may, for the at least one hazard tree, generate a notification of the potential hazard and/or the risk to the at least one asset. At step 1420 the hazard tree identification system 104 (for example, the notification module 222) may, for the at least one hazard tree, provide the notification of the potential hazard and/or the risk to the at least one asset. The hazard tree identification system 104 may generate and provide the notification as described herein.

One advantage of embodiments of the hazard tree identification system 104 and associated methods and non-transitory computer-readable media is that the hazard tree identification system 104 is able to predict patterns of hazard trees across large numbers of images that include electrical assets. Another advantage is that the hazard tree identification system 104 may minimize or reduce the amount of manual work that would otherwise be done to detect hazard trees. Images such as satellite images may be acquired frequently. The hazard tree identification system 104 may process such images as they are acquired and identify new hazard trees and/or stop tracking hazard trees as they are removed. Accordingly, the hazard tree identification system 104 may facilitate monitoring of a power distribution infrastructure on a periodic and/or as-needed basis.

Figure 15:
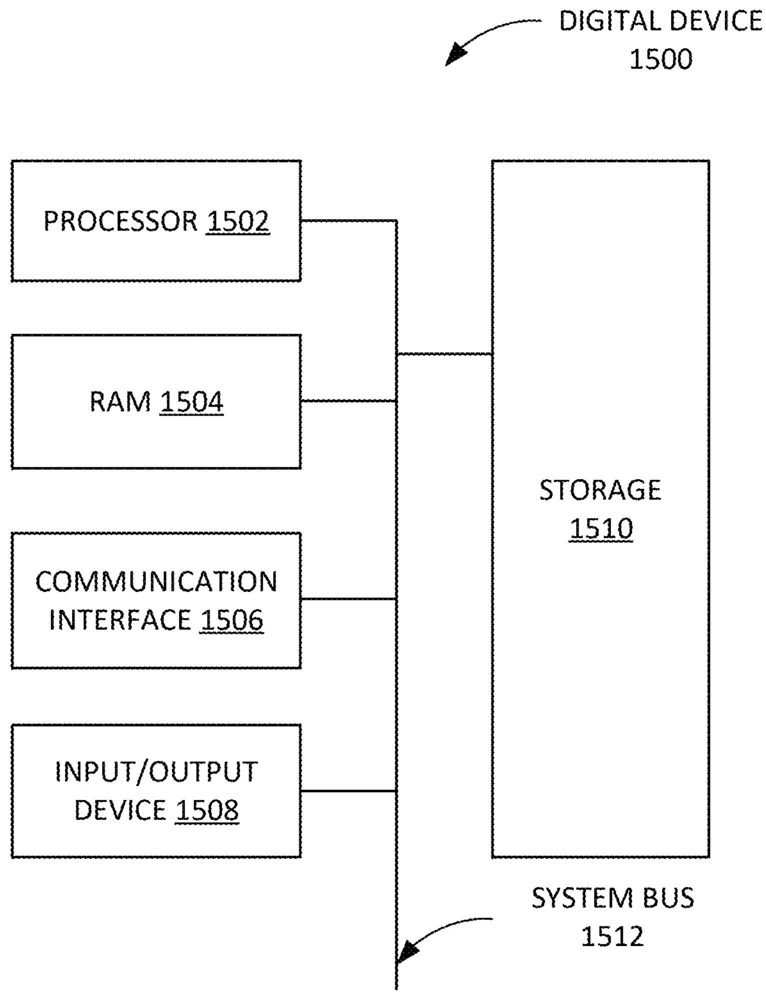
FIG. 15 depicts a block diagram of an example digital device in some embodiments.

FIG. 15 depicts a block diagram of an example digital device 1500 according to some embodiments. The digital device 1500 is shown in the form of a general-purpose computing device. The digital device 1500 includes at least one processor 1502, RAM 1504, communication interface 1506, input/output device 1508, storage 1510, and a system bus 1512 that couples various system components including storage 1510 to the at least one processor 1502. A system, such as a computing system, may be or include one or more of the digital device 1500.

System bus 1512 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The digital device 1500 typically includes a variety of computer system readable media, such as computer system readable storage media. Such media may be any available media that is accessible by any of the systems described herein and it includes both volatile and nonvolatile media, removable and non-removable media.

In some embodiments, the at least one processor 1502 is configured to execute executable instructions (for example, programs). In some embodiments, the at least one processor 1502 comprises circuitry or any processor capable of processing the executable instructions.

In some embodiments, RAM 1504 stores programs and/or data. In various embodiments, working data is stored within RAM 1504. The data within RAM 1504 may be cleared or ultimately transferred to storage 1510, such as prior to reset and/or powering down the digital device 1500.

In some embodiments, the digital device 1500 is coupled to a network, such as the communication network 108, via communication interface 1506. The digital device 1500 can communicate with one or more networks such as a local area network (LAN), a general wide area network (WAN), and/or a public network (for example, the Internet).

In some embodiments, input/output device 1508 is any device that inputs data (for example, mouse, keyboard, stylus, sensors, etc.) or outputs data (for example, speaker, display, virtual reality headset).

In some embodiments, storage 1510 can include computer system readable media in the form of non-volatile memory, such as read only memory (ROM), programmable read only memory (PROM), solid-state drives (SSD), flash memory, and/or cache memory. Storage 1510 may further include other removable/non-removable, volatile/non-volatile computer system storage media. By way of example only, storage 1510 can be provided for reading from and writing to a non-removable, non-volatile magnetic media. The storage 1510 may include a non-transitory computer-readable medium, or multiple non-transitory computer-readable media, which stores programs or applications for performing functions such as those described herein with reference to, for example, FIG. 2. Although not shown, a magnetic disk drive for reading from and writing to a removable, non-volatile magnetic disk (for example, a "floppy disk"), and an optical disk drive for reading from or writing to a removable, non-volatile optical disk such as a CDROM, DVD-ROM or other optical media can be provided. In such instances, each can be connected to system bus 1512 by one or more data media interfaces. As will be further depicted and described below, storage 1510 may include at least one program product having a set (for example, at least one) of program modules that are configured to carry out the functions of embodiments of the invention. In some embodiments, RAM 1504 is found within storage 1510.

Programs/utilities, having a set (at least one) of program modules, such as the hazard tree identification system 104, may be stored in storage 1510 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

It should be understood that although not shown, other hardware and/or software components could be used in conjunction with the digital device 1500. Examples include, but are not limited to microcode, device drivers, redundant processing units, and external disk drive arrays, RAID systems, tape drives, and data archival storage systems, etc.

Exemplary embodiments are described herein in detail with reference to the accompanying drawings. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure.

It will be appreciated that aspects of one or more embodiments may be embodied as a system, method, or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a solid state drive (SSD), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program or data for use by or in connection with an instruction execution system, apparatus, or device.

A transitory computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++, Python, or the like and conventional procedural programming languages, such as the "C" programming language or similar programming languages. The computer program code may execute entirely on any of the systems described herein or on any combination of the systems described herein.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While specific examples are described above for illustrative purposes, various equivalent modifications are possible. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented concurrently or in parallel or may be performed at different times. Further any specific numbers noted herein are only examples: alternative implementations may employ differing values or ranges.

Throughout this specification, plural instances may implement components, operations, or structures described as a single instance. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. Furthermore, any specific numbers noted herein are only examples: alternative implementations may employ differing values or ranges.

Components may be described or illustrated as contained within or connected with other components. Such descriptions or illustrations are examples only, and other configurations may achieve the same or similar functionality. Components may be described or illustrated as "coupled," "couplable," "operably coupled," "communicably coupled" and the like to other components. Such description or illustration should be understood as indicating that such components may cooperate or interact with each other, and may be in direct or indirect physical, electrical, or communicative contact with each other.

Components may be described or illustrated as "configured to," "adapted to," "operative to," "configurable to," "adaptable to," "operable to" and the like. Such description or illustration should be understood to encompass components both in an active state and in an inactive or standby state unless required otherwise by context.

The use of "or" in this disclosure is not intended to be understood as an exclusive "or." Rather, "or" is to be understood as including "and/or." For example, the phrase "providing products or services" is intended to be understood as having several meanings: "providing products," "providing services," and "providing products and services."

It may be apparent that various modifications may be made, and other embodiments may be used without departing from the broader scope of the discussion herein. For example, although determining potential hazards to electrical assets of electrical utilities and to assets (for example, pipelines) of other utilities (for example, natural gas distribution utilities) may be described, the systems and methods described herein may be applicable to determining potential hazards and/or risks to any structure (for example, antennas, buildings, roads, etc.) posed by hazard trees.

Therefore, these and other variations upon the example embodiments are intended to be covered by the disclosure herein.

The invention claimed is:

1. A non-transitory computer-readable medium comprising executable instructions, the executable instructions being executable by one or more processors to perform a method, the method comprising:

- receiving multiple images for a geographic area, the geographic area including multiple electrical assets of a power distribution infrastructure, a pixel of an image of the multiple images having one or more intensity values;
- classifying, using one or more convolutional neural networks, at least some pixels of each image of at least some of the multiple images as hazard tree pixels or as non-hazard tree pixels, wherein classifying the at least some pixels as hazard tree pixels or as non-hazard tree pixels is based on the one or more intensity values of each pixel of the at least some pixels, a hazard tree being a tree or vegetation that is dead, unhealthy, or that has structural or other material defects, wherein classifying, using the one or more convolutional neural networks, the at least some pixels as hazard tree pixels or as non-hazard tree pixels includes:

generating multiple probability data structures by processing the multiple images using the one or more convolutional neural networks, a probability data structure of the multiple probability data structures corresponding to an image of the multiple images and including, for each pixel of the at least some pixels of the image, a probability value that indicates a probability that the pixel is a portion of one or more hazard trees; and generating multiple classification data structures based on the multiple probability data structures, a classification data structure corresponding to an image of the multiple images and including, for each pixel of the at least some pixels of the image, a classification of the pixel as a hazard tree pixel or as a non-hazard tree pixel, wherein generating the multiple classification data structures based on the multiple probability data structures includes, for each probability data structure of at least some of the multiple probability data structures:

for each probability value of at least some of the probability values in the probability data structure:

comparing the probability value to a threshold value;

if the probability value is equal to or greater than the threshold value, classifying the pixel corresponding to the probability value as a hazard tree pixel; and if the probability value is less than the threshold value, classifying the pixel corresponding to the probability value as a non-hazard tree pixel; and generating a classification data structure that includes, for each pixel of the at least some pixels of the image, the classification of the pixel as a hazard tree pixel or as a non-hazard tree pixel;

generating, based on at least some hazard tree pixels, multiple polygons, a polygon of the multiple polygons corresponding to one or more hazard trees in the geographic area; and for at least a particular polygon of the multiple polygons:

determining a height for the particular polygon;

determining a distance from the particular polygon to a particular electrical asset of the multiple electrical assets;

determining, based on the height and the distance, that one or more particular hazard trees corresponding to the particular polygon are a potential hazard to the particular electrical asset;

generating a notification of the potential hazard to the particular electrical asset; and providing the notification of the potential hazard to the particular electrical asset.

2. The non-transitory computer-readable medium of claim 1, the method further comprising normalizing the one or more intensity values of each pixel of the at least some pixels of each image of the at least some of the multiple images.

3. The non-transitory computer-readable medium of claim 1, the method further comprising training the one or more convolutional neural networks using one or more generative adversarial networks.

4. The non-transitory computer-readable medium of claim 1, the method further comprising, for at least the particular polygon, determining a risk posed to the particular electrical asset by the one or more particular hazard trees corresponding to the particular polygon, wherein:

generating the notification of the potential hazard to the particular electrical asset includes generating a user interface that includes the particular electrical asset and an indication of the risk to the particular electrical asset, and providing the notification of the potential hazard to the particular electrical asset includes providing the user interface.

5. The non-transitory computer-readable medium of claim 1, wherein classifying, using the one or more convolutional neural networks, the at least some pixels as hazard tree pixels or as non-hazard tree pixels further includes, for each image of the at least some of the multiple images:

generating one or more transformed images by performing one or more transformations on the image;

processing, by the one or more convolutional neural networks, the one or more transformed images to generate one or more intermediate values for each pixel of the at least some pixels of the image; and classifying, based on the one or more intermediate values, each pixel of the at least some pixels of the image as a hazard tree pixel or as a non-hazard tree pixel.

6. The non-transitory computer-readable medium of claim 5, wherein generating the one or more transformed images by performing the one or more transformations on the image includes performing one or more of a rotation of the image, a flip of the image, a resizing of the image, and an addition of noise to the image.

7. The non-transitory computer-readable medium of claim 5, wherein classifying, based on the one or more intermediate values, each pixel of the at least some pixels of the image as a hazard tree pixel or as a non-hazard tree pixel includes applying a statistical function to the one or more intermediate values of each pixel of the at least some pixels of the image.

8. The non-transitory computer-readable medium of claim 1, wherein generating, based on the at least some hazard tree pixels, the multiple polygons includes determining multiple boundaries of the multiple polygons using morphological operations.

9. The non-transitory computer-readable medium of claim 1, the method further comprising:

receiving multiple locations of the multiple electrical assets;

determining, based on the multiple locations of the multiple electrical assets, a first particular location for the particular electrical asset; and determining a second particular location for the particular polygon, wherein determining the distance from the particular polygon to the particular electrical asset includes determining, based on the first particular location and the second particular location, the distance from the particular polygon to the particular electrical asset.

10. The non-transitory computer-readable medium of claim 1, wherein the particular polygon is a first particular polygon, the height is a first height, the distance is a first distance, the particular electrical asset is a first particular electrical asset, the potential hazard is a first potential hazard, the notification is a first notification, and the method further comprising, for second particular polygons of the multiple polygons:

determining second heights for the second particular polygons;

comparing the second heights to a height threshold value; and for only the second particular polygons for which the second heights meet or exceed the height threshold value:

determining second distances from the second particular polygons to second particular electrical assets of the multiple electrical assets;

determining, based on the second heights and the second distances, that one or more second particular hazard trees corresponding to the second particular polygons represent second potential hazards to the second particular electrical assets;

generating second notifications of the second potential hazards to the second particular electrical assets; and providing the second notifications of the second potential hazards to the second particular electrical assets.

11. A method, comprising:

receiving multiple images for a geographic area, the geographic area including multiple assets of a utility, a pixel of an image of the multiple images having one or more intensity values;

identifying, using one or more trained models, multiple hazard trees in the multiple images, wherein identifying includes:

classifying, using the one or more trained models, at least some pixels of each image of at least some of the multiple images as hazard tree pixels or as a non-hazard tree pixels, wherein classifying the at least some pixels as hazard tree pixels or as non-hazard tree pixels is based on the one or more intensity values of each pixel of the at least some pixels, a hazard tree being a tree or vegetation that is dead, unhealthy, or that has structural or other material defects, wherein classifying, using the one or more trained models, the at least some pixels of each image of the at least some of the multiple images as hazard tree pixels or as non-hazard tree pixels includes classifying, using one or more convolutional neural networks, the at least some pixels of each image of the at least some of the multiple images as hazard tree pixels or as non-hazard tree pixels, wherein classifying, using the one or more convolutional neural networks, the at least some pixels of each image of the at least some of the multiple images as hazard tree pixels or as non-hazard tree pixels includes:

generating multiple probability data structures by processing the at least some of the multiple images using the one or more convolutional neural networks, a probability data structure of the multiple probability data structures corresponding to an image of the at least some of the multiple images and including, for each pixel of the at least some pixels of the image, a probability value indicating a probability that the pixel is a portion of the multiple hazard trees; and generating multiple classification data structures based on the multiple probability data structures, a classification data structure corresponding to an image of the at least some of the multiple images and including, for each pixel of the at least some pixels of the image, a classification of the pixel as a hazard tree pixel or as a non-hazard tree pixel, wherein generating the multiple classification data structures based on the multiple probability data structures includes, for each probability data structure of at least some of the multiple probability data structures:

for each probability value of at least some of the probability values in the probability data structure:

comparing the probability value to a threshold value;

if the probability value is equal to or greater than the threshold value, classifying the pixel corresponding to the probability value as a hazard tree pixel; and if the probability value is less than the threshold value, classifying the pixel corresponding to the probability value as a non-hazard tree pixel; and generating a classification data structure that includes, for each pixel of the at least some pixels of the image, the classification of the pixel as a hazard tree pixel or as a non-hazard tree pixel; and identifying, based on at least some hazard tree pixels, the multiple hazard trees; and for at least one hazard tree of the multiple hazard trees:

determining at least one height of the at least one hazard tree;

determining at least one distance between the at least one hazard tree and at least one asset of the multiple assets;

determining, based on the at least one height and the at least one distance, that the at least one hazard tree is a potential hazard to the at least one asset;

generating a notification of the potential hazard to the at least one asset; and providing the notification of the potential hazard to the at least one asset.

12. The method of claim 11, wherein classifying, using the one or more convolutional neural networks, the at least some pixels of each image of the at least some of the multiple images as hazard tree pixels or as non-hazard tree pixels further includes, for each image of the at least some of the multiple images:

generating one or more transformed images by performing one or more transformations on the image;

processing, by the one or more convolutional neural networks, the one or more transformed images to generate one or more intermediate values for each pixel of at least some pixels of the image; and classifying, based on the one or more intermediate values, each pixel of the at least some pixels of the image as a hazard tree pixel or as a non-hazard tree pixel.

13. The method of claim 12, wherein generating the one or more transformed images by performing the one or more transformations on the image includes performing one or more of a rotation of the image, a flip of the image, a resizing of the image, and an addition of noise to the image.

14. The method of claim 12, wherein classifying, based on the one or more intermediate values, each pixel of the at least some pixels of the image as a hazard tree pixel or as a non-hazard tree pixel includes applying a statistical function to the one or more intermediate values of each pixel of the at least some pixels of the image.

15. The method of claim 11, further comprising normalizing the one or more intensity values of each pixel of the at least some pixels of each image of the at least some of the multiple images.

16. The method of claim 11, further comprising generating the one or more trained models by training one or more models using one or more generative adversarial networks.

17. The method of claim 11, further comprising, for the at least one hazard tree, determining a risk posed to the at least one asset by the at least one hazard tree, wherein:

generating the notification of the potential hazard to the at least one asset includes generating a user interface that includes the at least one asset and an indication of the risk to the at least one asset, and providing the notification of the potential hazard to the at least one asset includes providing the user interface.

18. The method of claim 11, wherein identifying the multiple hazard trees includes identifying the multiple hazard trees using morphological operations.

19. A system comprising at least one processor and memory containing executable instructions, the executable instructions being executable by the at least one processor to:

receive multiple images for a geographic area, the geographic area including multiple assets of a utility, a pixel of an image of the multiple images having one or more intensity values;

identify, using one or more trained models, multiple hazard trees in the multiple images, wherein the executable instructions being executable by the at least one processor to identify include executable instructions being executable by the at least one processor to:

classify, using the one or more trained models, at least some pixels of each image of at least some of the multiple images as hazard tree pixels or as non-hazard tree pixels, wherein to classify the at least some pixels as hazard tree pixels or as non-hazard tree pixels is based on the one or more intensity values of each pixel of the at least some pixels, a hazard tree being a tree or vegetation that is dead, unhealthy, or that has structural or other material defects, wherein the executable instructions being executable by the at least one processor to classify, using the one or more trained models, the at least some pixels of each image of the at least some of the multiple images as hazard tree pixels or as non-hazard tree pixels include executable instructions being executable by the at least one processor to classify, using one or more convolutional neural networks, the at least some pixels of each image of the at least some of the multiple images as hazard tree pixels or as non-hazard tree pixels, wherein the executable instructions being executable by the at least one processor to classify, using the one or more convolutional neural networks, the at least some pixels of each image of the at least some of the multiple images as hazard tree pixels or as non-hazard tree pixels include executable instructions being executable by the at least one processor to:

generate multiple probability data structures by processing the at least some of the multiple images using the one or more convolutional neural networks, a probability data structure of the multiple probability data structures corresponding to an image of the at least some of the multiple images and including, for each pixel of the at least some pixels of the image, a probability value indicating a probability that the pixel is a portion of the multiple hazard trees; and generate multiple classification data structures based on the multiple probability data structures, a classification data structure corresponding to an image of the at least some of the multiple images and including, for each pixel of the at least some pixels of the image, a classification of the pixel as a hazard tree pixel or as a non-hazard tree pixel, wherein the executable instructions being executable by the at least one processor to generate the multiple classification data structures based on the multiple probability data structures include executable instructions being executable by the at least one processor to, for each probability data structure of at least some of the multiple probability data structures:

for each probability value of at least some of the probability values in the probability data structure:

compare the probability value to a threshold value;

if the probability value is equal to or greater than the threshold value, classify the pixel corresponding to the probability value as a hazard tree pixel; and if the probability value is less than the threshold value, classify the pixel corresponding to the probability value as a non-hazard tree pixel; and generate a classification data structure that includes, for each pixel of the at least some pixels of the image, the classification of the pixel as a hazard tree pixel or as a non-hazard tree pixel; and identify, based on at least some hazard tree pixels, the multiple hazard trees; and for at least one hazard tree of the multiple hazard trees:

determine at least one height of the at least one hazard tree based on one or more canopy height models;

determine at least one distance between the at least one hazard tree and at least one asset of the multiple assets;

determine, based on the at least one height and the at least one distance, that the at least one hazard tree is a potential hazard to the at least one asset;

generate a notification of the potential hazard to the at least one asset; and provide the notification of the potential hazard to the at least one asset.

20. The system of claim 19 wherein the executable instructions being executable by the at least one processor to classify, using the one or more convolutional neural networks, the at least some pixels of each image of the at least some of the multiple images as the hazard tree pixels or as the non-hazard tree pixels include executable instructions being executable by the at least one processor to, for each image of the at least some of the multiple images:

generate one or more transformed images by performing one or more transformations on the image;

process, by the one or more convolutional neural networks, the one or more transformed images to generate one or more intermediate values for each pixel of the at least some pixels of the image; and classify, based on the one or more intermediate values, each pixel of the at least some pixels of the image as a hazard tree pixel or as a non-hazard tree pixel.

21. The system of claim 20 wherein the executable instructions being executable by the at least one processor to generate the one or more transformed images by performing the one or more transformations on the image include executable instructions being executable by the at least one processor to perform one or more of a rotation of the image, a flip of the image, a resizing of the image, and an addition of noise to the image.

* * * * *